United States Patent
Yamamoto et al.

(10) Patent No.: US 6,484,068 B1
(45) Date of Patent: Nov. 19, 2002

(54) ROBOT APPARATUS AND METHOD FOR CONTROLLING JUMPING OF ROBOT DEVICE

(75) Inventors: Takashi Yamamoto, Tokyo (JP); Martin de Lasa, Cambridge, MA (US); Shervin Talebinejad, Cambridge, MA (US); Darrin Jewell, Cambridge, MA (US); Robert Playter, Cambridge, MA (US); Marc Raibert, Cambridge, MA (US)

(73) Assignees: Sony Corporation, Tokyo (JP); Boston Dynamics Inc, Cambridge, MA (US)

(*) Notice: Subject to any disclaimer, the term of this patent is extended or adjusted under 35 U.S.C. 154(b) by 0 days.

(21) Appl. No.: 09/960,658

(22) Filed: Sep. 21, 2001

Related U.S. Application Data

(60) Provisional application No. 60/307,692, filed on Jul. 24, 2001.

(51) Int. Cl.[7] .............................................. G06F 19/00
(52) U.S. Cl. ..................... 700/245; 700/31; 700/248; 700/258; 700/259; 318/568.1; 318/568.11; 318/568.12; 318/569; 901/1; 901/15; 901/47; 198/380; 198/394; 701/23
(58) Field of Search ........................ 700/31, 245, 248, 700/258, 259; 318/568.1, 568.11, 568.12, 568.2, 569, 16, 565; 901/1, 15, 47; 704/209, 207, 270; 348/121; 701/23; 198/380, 394

(56) References Cited

U.S. PATENT DOCUMENTS

| | | | | |
|---|---|---|---|---|
| 5,351,626 A | * | 10/1994 | Yanagisawa | 198/380 |
| 5,455,497 A | * | 10/1995 | Hirose et al. | 198/394 |
| 5,524,326 A | * | 6/1996 | Markowitz | 198/394 |
| 5,765,508 A | * | 6/1998 | Markowitz | 198/380 |
| 6,141,019 A | * | 10/2000 | Roseborough et al. | 345/473 |
| 2002/0024312 A1 | * | 2/2002 | Takagi | 318/568.12 |

OTHER PUBLICATIONS

Hugel et al., Towards efficient implementation of quadriped gaits with duty factor of 0.75, 1999, IEEE, pp. 2360–2365.*
Arikawa et al., Development of quadruped walking robot TITAN–III, 1996, IEEE, pp. 208–214.*
Chevallereau et al., Control of a walking robot with feet folling a reference trajectory derived from ballistic motion, 1997, IEEE, pp. 1094–1099.*
Sony Electronic, Inc. AIBO, 2000, Advertisement brochure, p. 1.*

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer

(57) ABSTRACT

A robot apparatus that is able to perform jumping. In a leg structure 110 of the robot apparatus, connecting bars 113, 114 and pivots 112a to 112d constitute a four-point link mechanism. A rod 117 is inserted into an opening formed in the distal end of a leg part 116. A coil spring 118 as an elastic member is provided between one end of the rod 117 and the distal end of the leg part 116. A bar member 120 is connected and secured to a preset point of a connecting member 115 as a knee joint. The coil spring 118 is extended/contracted by the stretching/contraction of the connecting member 115. By the operation of the four-point link mechanism, the trajectory of the distal end of the leg part is linear. The coil spring 118 is mounted at a position such that the distance between a driving shaft 101 and the distal end of the bar member 120 has a substantially linear relationship with respect to the force virtually operating between a driving shaft 101 and the distal end of the bar member 120.

19 Claims, 17 Drawing Sheets

FIG.8

| | NAME OF INPUT EVENT | DATA NAME | DATA RANBGE | PROBABILITY OF TRANSITION TO OTHER NODE Di | | | | | |
|---|---|---|---|---|---|---|---|---|---|
| | | | | A | B | C | D | | n |
| node 100 | | | | node 120 | node 120 | node 1000 | | | node 600 |
| TRANSITION DESTINATION NODE | | | | | | | | | |
| OUTPUT BEHAVIOR | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | | | | |
| 5 | OBSTACLE | DISTANCE | 0.100 | | | 50% | | | |
| 6 | | JOY | 50.100 | | | 100% | | | |
| 7 | | SURPRISE | 50.100 | | | | | | |
| 8 | | SADNESS | 50.100 | | | | | | |

80

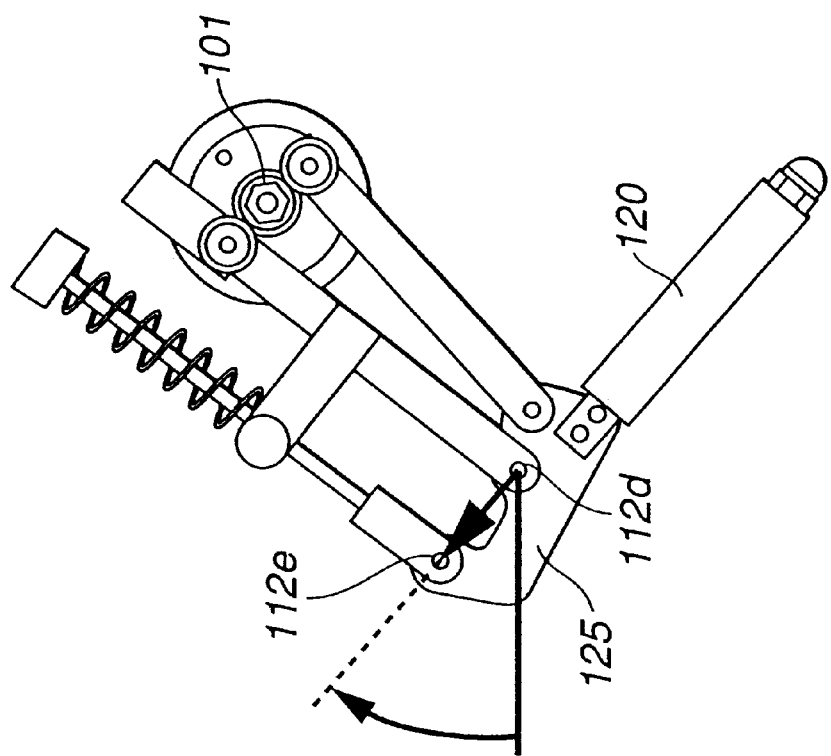
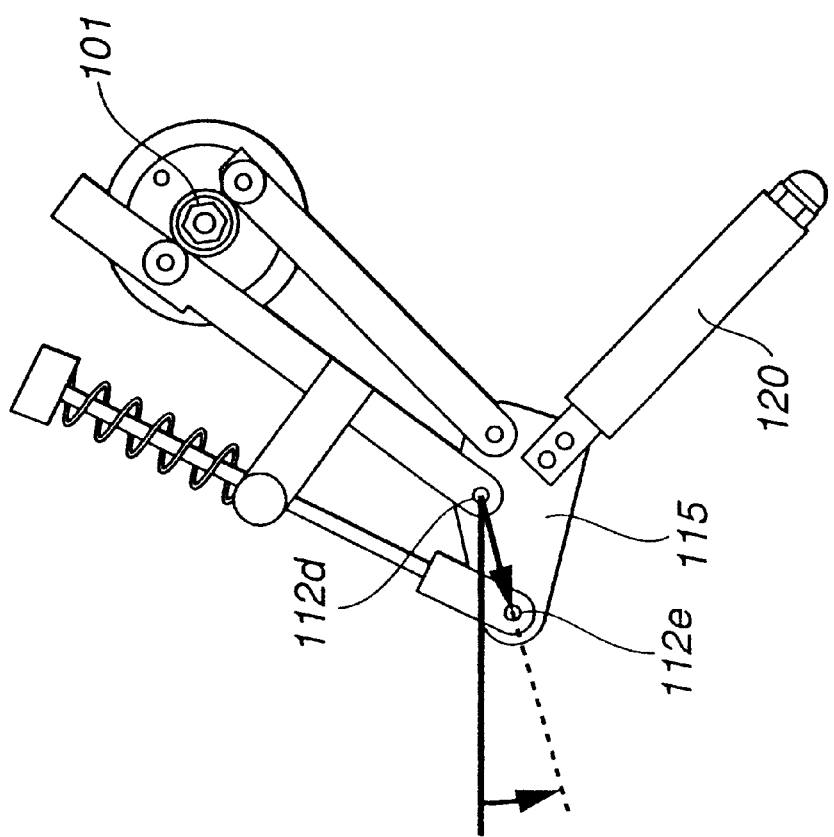
FIG.13(A)
FIG.13(B)

ROBOT APPARATUS AND METHOD FOR CONTROLLING JUMPING OF ROBOT DEVICE

This application claims the benefit of U.S. provisional application No. 60/307,692, filed Jul. 24, 2001.

BACKGROUND OF THE INVENTION

1. Field of the Invention

This invention relates to a robot apparatus performing jumping and a method for controlling the jumping of the robot apparatus.

2. Description of Related Art

Recently, a proposal has been made for a robot apparatus simulating the shape of an animal, or a so-called pet robot. This robot apparatus has the shape like that of a dog or a cat kept in a household at large, and behaves autonomously responsive to actions from a user (keeper) such as "striking" or "caressing" or to surrounding environment. The autonomous behavior may be enumerated by, for example, "barking" or "lying down", as in the case of actual animals.

If the robot apparatus can behave more like actual animals, the apparatus can be felt to resemble actual living animals more closely, such that the user (keeper) feels more akin to and satisfied with the robot apparatus. This also enhances amusement properties of the robot apparatus.

For example, if a robot apparatus can jump as actual living animals, the keeper feels more akin to and satisfied with the robot apparatus.

Meanwhile, a number of researches and developments have been conducted on dynamic running movements of a quadruped robot apparatus. For example, towards the middle of eighties, Raibert developed a robot apparatus, inclusive of a quadruped robot, performing a series of jumping ands running movements. This quadruped robot could perform running in four running styles, namely trotting, which is running at a rapid speed, pacing, which is running at a constant speed, pronking, which is jumping with all of four legs, approximately simultaneously, and bounding, which is jumping as front and back legs alternately touch the ground. Raibert also proposed running control, comprised of three elements, which control can be applied in substantially the same manner to one-legged, two-legged and quadruped robots, More recently, Buehler et al., attempted to improve the three-element algorithm and realized a stable bounding for quadruped robots by taking advantage of torque control at a stance position and quasi-static slip control algorithm.

Moreover, Talebi and Buehler showed that a simplified control rule can be exploited in order to stabilize the running despite the fact that task-level feedback, such as feedback on the level of advancing speed or trunk angle, is not used, and further expanded this operation. By this approach, more efficient and powerful running could be achieved.

In addition, Akiyama and Kimura et al., realized planar running using a biologically disclosed motor control model.

The results of the above-mentioned researches are shown for example in the following publications:

[1] M. H. Raibert, "Legged Robot That Balance", MIT Press. Cambridge, Mass., 1986;

[2] M. H. Raibert, 1990 Trotting, Pacing, and Bounding by a Quadruped Robot, J. Biomechamics, Vol.23, Suppl. 1, 79–98;

[3] D. Papadopoulos and M. Buehler, "Stable Running in a Quadruped Robot with Compliant Legs", IEEEInt. Conf. Robotics and Automation, San Francisco, Calif., April 2000;

[4] S. Talebi, I. Poulakakis, E. Papadopoulos and M. Buehler, "Quadruped Robot Running with a Bounding Gait", Int. Symp. Experimental Robotics, Honolulu, Hi., Dec. 2000;

[5] S. Akiyama and H. Kimura, "Dynamic Quadruped Walk Using Neural Oscillators-Realization of Pace and Trot" 23th Annual Conf. RSJ, p.227 to 228, 1995.

Among the results of past searches in a robot apparatus, performing stabilized jumping, that by MIT Legged Laboratory is most well-known. This technique uses a highly simplified control rule, which is thought to represent effective means in application to a robot apparatus, for which cost is of primary consideration, such as an entertainment robot, e.g., a pet robot.

However, this technique is premised on the use of a pneumatically driven translatory joint, performing stretching/contracting movements, at the legs, and hence is difficult to apply to a robot apparatus having a leg structure simulating an animal, such as a pet robot walking on four legs. That is, such pet robot has joints driven by an actuator, with its leg structure simulating that of an animal, so that the above-mentioned pneumatically driven translatory joint cannot be used, thus raising difficulties in performing stabilized jumping movements.

That is, in a robot apparatus having a leg structure simulating that of an animal, walking on four legs, it has not been possible to realize a low-cost mechanism of high reliability which enables jumping movements.

SUMMARY OF THE INVENTION

It is therefore an object of the present invention to provide a robot apparatus enabling jumping movements and a jumping controlling method for this robot apparatus.

In one aspect, the present invention provides a robot apparatus in which a leg part including a link mechanism connected to an elastic member is rotationally mounted to a trunk part through driving means, wherein the elastic member is mounted so that a substantially linear relation will be maintained between the distance between the driving means and the distal end of the leg part and a force virtually operating between the driving means and the distal end of the leg part.

The link mechanism includes a first connecting bar having its one end rotationally connected to a rotational member rotated by the driving means and having its other end rotationally connected to a connecting member, and a second connecting bar having its one end rotationally connected to the rotational member and having its other end rotationally connected to the connecting member, to form a four-point link mechanism, which four-point link mechanism is formed to provide for a linear trajectory of the distal end of the leg part.

With this leg part of the robot apparatus, the distance between the driving means and the distal end of the leg part has a substantially linear relation with respect to a force virtually operating between the driving means and the distal end of the leg part. In another aspect, the present invention provides a robot apparatus having at least one pair of leg parts provided protruding from a main body portion, in which at least one pair of the leg parts may transfer from a stance state with the distal ends of the leg parts touching the ground to a flight state with the distal ends floating in air after lapse of a preset time, by way of performing jumping.

The robot apparatus includes a pair of front leg parts and a air of back leg parts, wherein at least one of the front and back leg parts may transfer from a stance state with the distal ends of the leg parts touching the ground to a flight state with the distal ends floating in air after lapse of a preset time.

With the robot apparatus, the jumping mode can be switched by changing the touchdown angle and the delay time of at least one leg part. The jumping mode may at least include a pronking mode of jumping with both the front and back legs touching the ground and jumping substantially simultaneously and abounding mode of jumping with the front and back leg parts alternately touching the ground.

With this robot apparatus, at least one of the leg parts may transfer from the stance state, in which the distal end of the leg part touches the ground, to a flight state in which the distal end of the leg part is floated in air, after lapse of a preset time, to perform jumping. The jumping mode can be switched by varying the touch angle of the leg and the delay time.

In still another aspect, the present invention provides a method for controlling the jumping of a robot apparatus in which a leg part including a link mechanism connected to an elastic member is rotationally mounted to a trunk pat through driving means, wherein the elastic member is mounted so that a substantially linear relation will be maintained between the distance between the driving means and the distal end of the leg part and a force virtually operating between the driving means and the distal end of the leg part.

The link mechanism may include a first connecting bar having its one end rotationally connected to a rotational member rotated by the driving means and having its other end rotationally connected to a connecting members and a second connecting bar having its one end rotationally connected to the rotational member and having its other end rotationally connected to the connecting member, to form a four-point link mechanism, which four-point link mechanism is formed to provide for a linear trajectory of the distal end of the leg part.

With this jump controlling method for the robot apparatus, a substantially linear relation may be maintained between the distance between the driving means and the distal end of the leg part and a force virtually operating between the driving means and the distal end of the leg part.

In yet another aspect, the present invention provides a method for controlling the jumping of a robot apparatus having at least one pair of leg parts protruding from a main body portion, in which the method includes a delaying step for providing a delay of a preset time from the stance state with the at least one pair of leg parts touching the ground and a step of transferring to a flight state with the at least one pair of legs floating in air after lapse of the delay time. The transferring step is made sequentially from the stance state through the delaying step to the flight state to perform jumping.

The robot apparatus may include a pair of front leg parts and a pair of back leg parts. At least one of the front leg parts and the back leg parts is subjected to delay of a preset time in the delay step.

The touchdown angle and the delay time of the at least one leg part may be changed to switch the jumping mode, The jumping mode may at least include a pronking mode of jumping with both the front and back legs touching the ground and jumping substantially simultaneously and a bounding mode of jumping with the front and back leg parts alternately touching the ground.

With this method for controlling the jumping of a robot apparatus, at least one pair of the leg parts may transfer from the stance state in which the distal ends of the leg parts touch the ground to a flight state in which the distal ends of the leg parts float in air, after lapse of a preset time, to perform jumping. Moreover, the jumping mode can be switched by changing the touchdown angle of the leg part and the delay angle.

BRIEF DESCRIPTION OF THE DRAWINGS

FIG. 8 illiterates a status transition table provided for each node of the finite probability automaton.

FIGS. 13A and 13B show a first embodiment and a second embodiment of the structure of the components of the leg structure, respectively.

DESCRIPTION OF THE PREFERRED EMBODIMENTS

Figure 1:
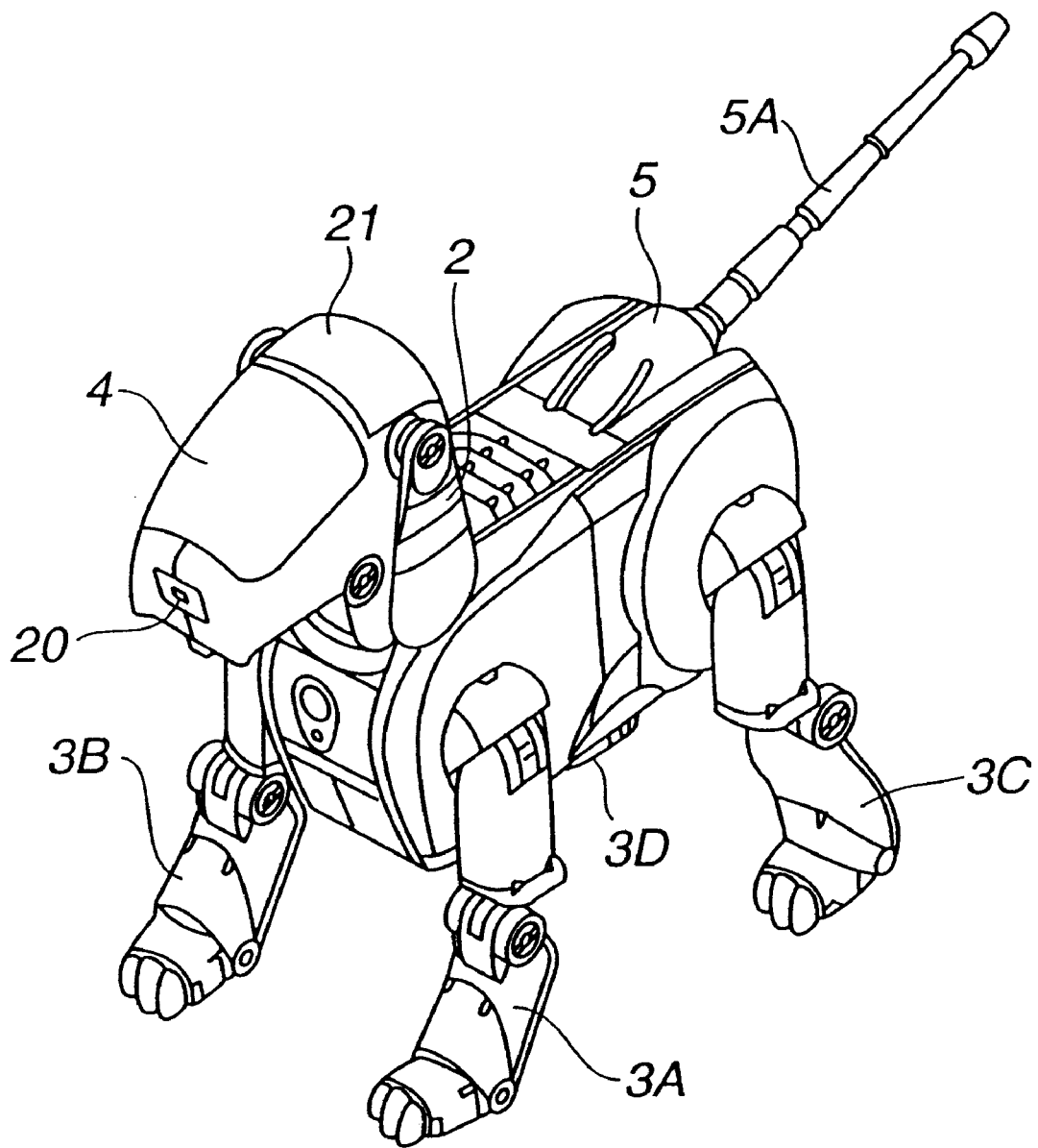
FIG. 1 is a perspective view showing an appearance of a robot apparatus embodying the present invention.

Referring to the drawings, a preferred embodiment of the present invention will be explained in detail. In the present embodiment, the present invention is applied to a robot apparatus behaving autonomously responsive to a surrounding environment (external factors) and to internal states (internal factors). Moreover, the present robot apparatus has a leg structure enabling jumping movements.

In the present embodiment, the structure of the robot apparatus is explained first and subsequently the portion of the robot apparatus to which the present invention is applied is explained in detail.

(1) Structure of a Robot Apparatus in the Present Embodiment

The robot apparatus shown in FIG. 1 is a so-called pet robot simulating the shape of a "dog". The pet robot includes a trunk unit 2, leg units 3A to 3D connected on the front side, back side, left side and on the right side of the trunk unit 2, respectively, and a head unit 4 and a tail unit 5, connected to the front and back ends of the trunk unit 2, respectively.

Figure 2:
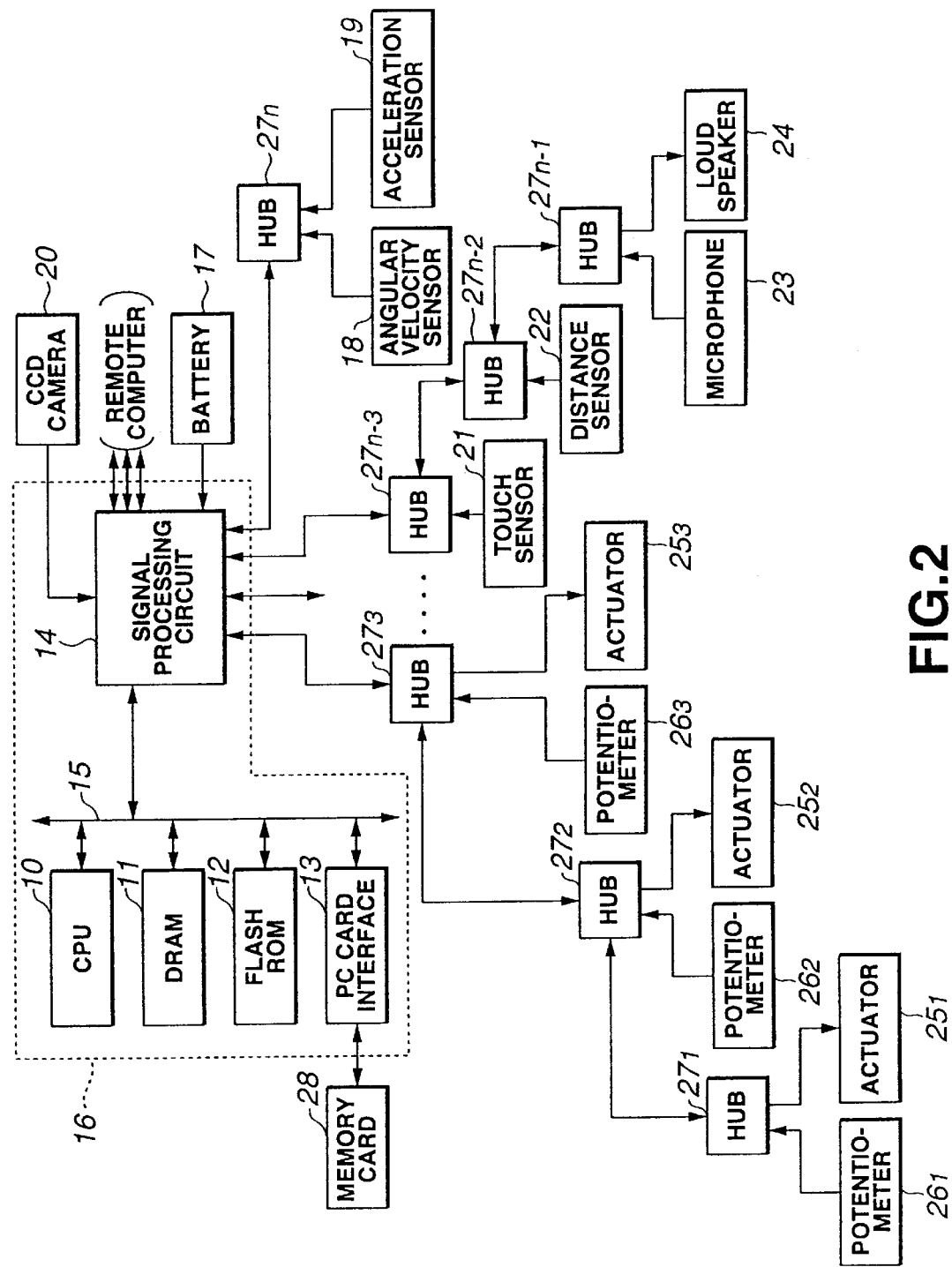
FIG. 2 is a block diagram showing a circuit structure of the robot apparatus.

Referring to FIG. 2, a controller 16, formed by interconnecting a CPU (central processing unit) 10, a DRAM (dynamic random access memory) 12, a PC (personal computer) card interface circuit 13 and a signal processing circuit 14, over an internal bus 15, and a battery 17, as a power source for the robot apparatus, are housed in the trunk unit 2. An angular velocity sensor 18 and an acceleration sensor 19 for detecting the orientation and the acceleration of motion of the robot apparatus 1, respectively, are also housed in the trunk unit 2.

The head unit 4 also includes, in position, a CCD (charge coupled device) camera 20 for imaging an outside status, a touch sensor 21 for detecting the pressure applied by physical actions from the user, such as "patting" or "hitting", a distance sensor 22 for measuring the distance to an object lying on the front side, a microphone 23 for collecting the outside sound, a loudspeaker 24 for outputting the sound, such as barking, and LEDs (light emitting diodes), not shown, operating as "eyes" for the robot apparatus 1.

In connecting portions of the leg units 3A to 3D and the trunk unit 2, connecting portions of the head unit 4 and the trunk unit 2 and in a connecting portion of a tail 5A of the tail unit 5, there are provided a number of actuators $25_1$, $25_2$, . . ., and a number of potentiometers $26_1$, $26_2$, . . . both corresponding to the number of the degree of freedom of the connecting portions in question. For example, the actuators $25_1$, $25_2$, . . . include servo motors. The leg units 3A to 3D are controlled by the driving of the servo motors to transfer to targeted orientation or operations.

The sensors, such as the angular velocity sensor 18, acceleration sensor 19, touch sensor 21, distance sensor 22, microphone 23, loudspeaker 24 and the potentiometers $26_1$, $26_2$, . . . , the LEDs and the actuators $25_1$, $25_2$, . . . are connected via associated hubs $27_1$ to $27_n$ to the signal processing circuit 14 of the controller 16, while the CCD camera 20 and the battery 17 are connected directly to the signal processing circuit 14.

The signal processing circuit 14 sequentially captures sensor data, picture data or speech data, furnished from the above-mentioned respective sensors, to cause the data to be sequentially stored over internal bus 15 in preset locations in the DRAM 11. In addition, the signal processing circuit 14 sequentially captures residual battery capacity data indicating the residual battery capacity supplied from the battery 17 to store the data in preset locations in the DRAM 11.

The respective sensor data, picture data, speech data and the residual battery capacity data, thus stored in the DRAM 11, are subsequently utilized when the CPU 10 performs operational control of the robot apparatus 1.

In actuality, in an initial stage of power up of the robot apparatus 1, the CPU 10 reads out a memory card 28 loaded in a PC card slot, not shown, of the trunk unit 2, or a control program stored in a flash ROM 12, either directly or through a PC card interface circuit 13, for storage in the DRAM 11.

The CPU 10 then verifies the its own status and surrounding statuses, and the possible presence of commands or actions from the user, based on the sensor data, picture data, speech data or residual battery capacity data.

The CPU 10 also determines the next ensuing actions, based on the verified results and on the control program stored in the DRAM 11, while driving the actuators $25_1$, $25_2$, . . . as necessary, based on the so determined results, to produce behaviors, such as swinging the head unit 4 in the up-and-down direction or in the left-and-right direction, moving the tail 5A of the tail unit 5 or driving the leg units 3A to 3D for walking or jumping.

The CPU 10 generates speech data as necessary and sends the so generated data through the signal processing circuit 14 as speech signals to the loudspeaker 24 to output the speech derived from the speech signals to outside or turns on or flicker the LEDs.

So, the present robot apparatus 1 is able to behave autonomously responsive to its own status and surrounding statuses, or to commands or actions from the user.

(2) Software Structure of Control Program

Figure 3:
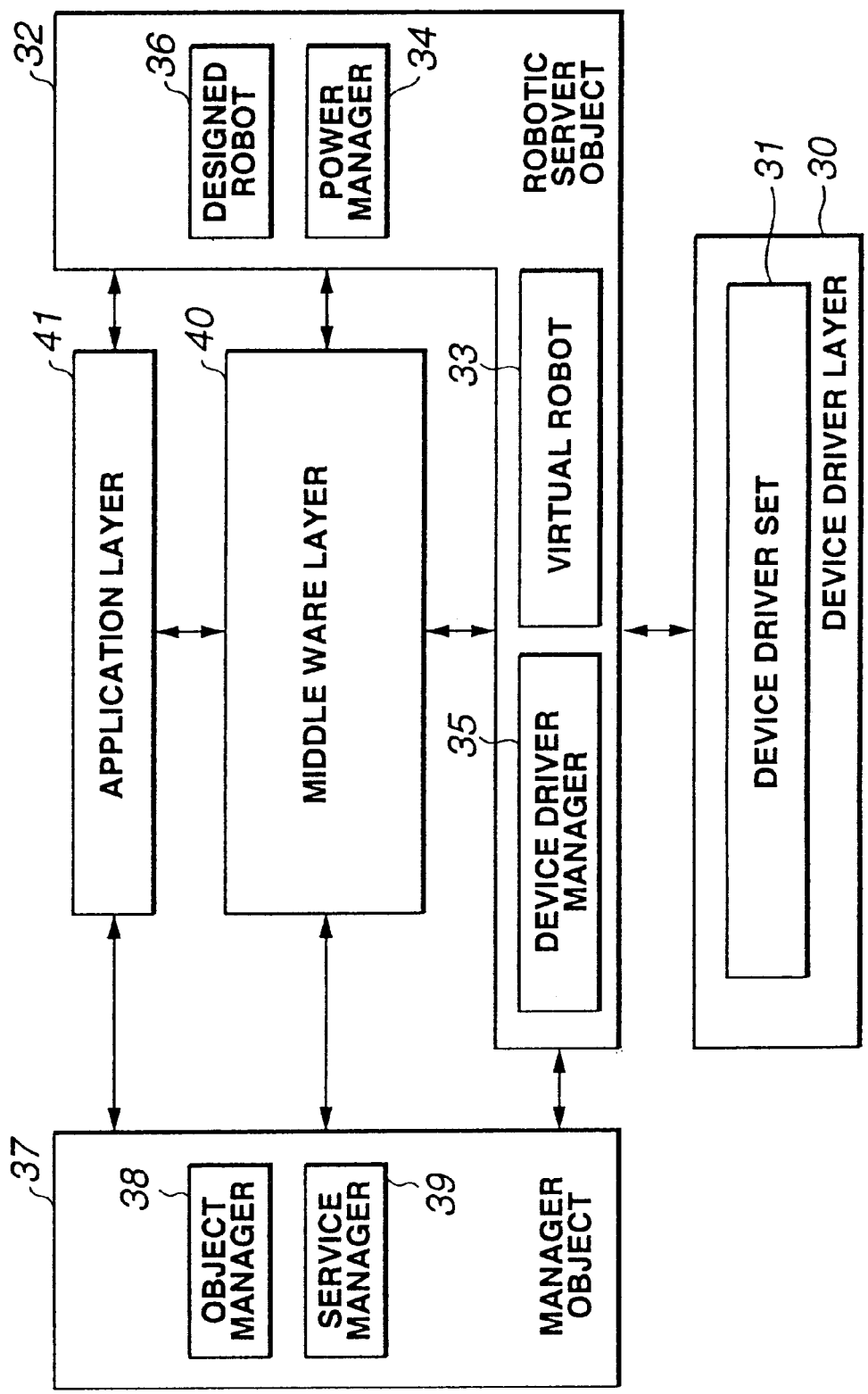
FIG. 3 is a block diagram showing a software structure of the robot apparatus.

The software structure of the above-described control program in the present robot apparatus 1 is shown in FIG. 3, in which a device driver layer 30 is located at the lowermost layer of the control program and is comprised of a device driver set 31 made up of a plural number of device drivers. In such case, each device driver is an object that is allowed to directly access the hardware used in a routine computer, such as CCD camera 20 or a timer, and performs processing responsive to interrupts from the associated hardware.

A robotics server object 32 is located in the lowermost layer of the device driver layer 30 and is comprised of a virtual robot 33, made up of plural software furnishing an interface for accessing the hardware, such as the aforementioned various sensors or actuators $25_1$, $25_2$, . . . a power manager 34, made up of a set of software for managing the switching of power sources, a device driver manager 35, made up of a set of software for managing other variable device drivers, and a designed robot 36 made up of a set of software for managing the mechanism of the robot apparatus 1.

A manager object 37 is comprised of an object manager 38 and a service manager 39. It is noted that the object manager 38 is a set of software supervising the booting or termination of the sets of software included in the robotics server object 32, middleware layer 40 and in the application layer 41. The service manager 39 is a set of software supervising the connection of the respective objects based on the connection information across the respective objects stated In the connection files stored in the memory card 28 (see FIG. 2).

The middleware layer 40 is located in an upper layer of the robotics server object 32, and is made up of a set of software furnishing the basic functions of the robot apparatus 1, such as picture or speech processing. The application layer 41 is located at an upper layer of the middleware layer 40 and is made up of a set of software for determining the behavior of the robot apparatus 1 based on the results of processing by the software sets forming the middleware layer 40.

Figure 4:
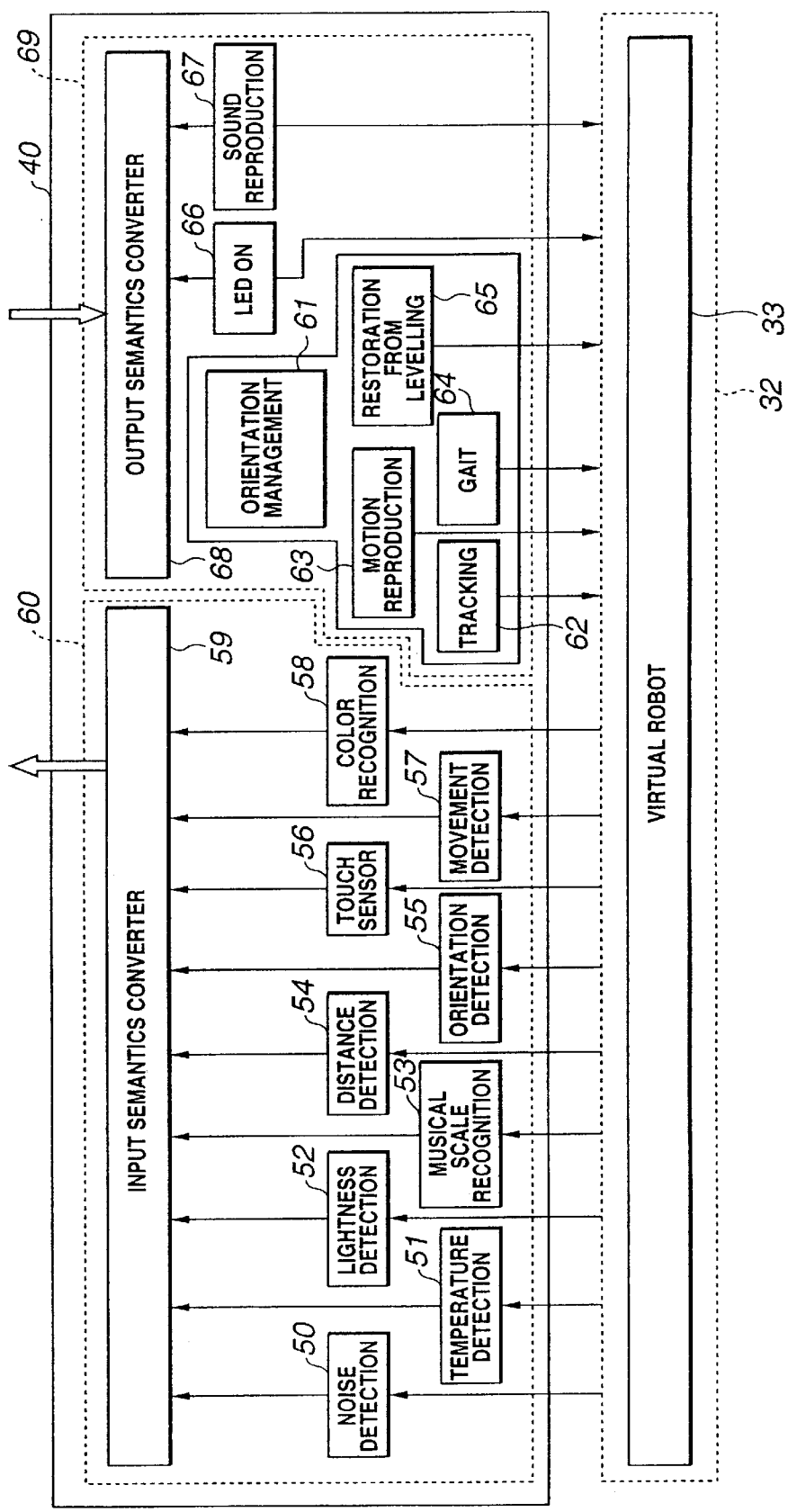
FIG. 4 is a block diagram showing the structure of a middleware layer in the software structure of the robot apparatus.

FIG. 4 shows a specified software structure of the middleware layer 40 and the application layer 41.

In FIG. 4, the middleware layer 40 signal includes a recognition module 60, provided with processing modules 50 to 58 for detecting the noise, temperature, lightness, sound scale, distance, orientation, touch sensing, motion detection and color recognition and with an input semantics converter module 59, and an outputting system 69, provided with an output semantics converter module 68 and with signal processing modules for orientation management, tracking, motion reproduction, walking, restoration of leveling, LED lighting and sound reproduction.

The processing modules 50 to 58 of the recognition module 60 capture data of interest from sensor data, picture data and speech data read out from a DRAM 11 (FIG. 2) by the virtual robot 33 of the robotics server object 32 and perform preset processing based on the so captured data to route the processed results to the input semantics converter module 59. It is noted that the virtual robot 33 is designed and constructed as a component portion responsible for signal exchange or conversion in accordance with a preset communication protocol.

Based on these results of the processing, supplied from the processing modules 50 to 58, the input semantics converter module 59 recognizes its own status and the status of the surrounding environment, such as "noisy", "hot". "light", "a ball detected", "leveling down detected", "patted", "hit", "sound scale of do, mi and so heard", "a moving object detected", or "an obstacle detected", or the commands or actions from the user, and outputs the recognized results to the application layer 41 (FIG. 3).

Figure 5:
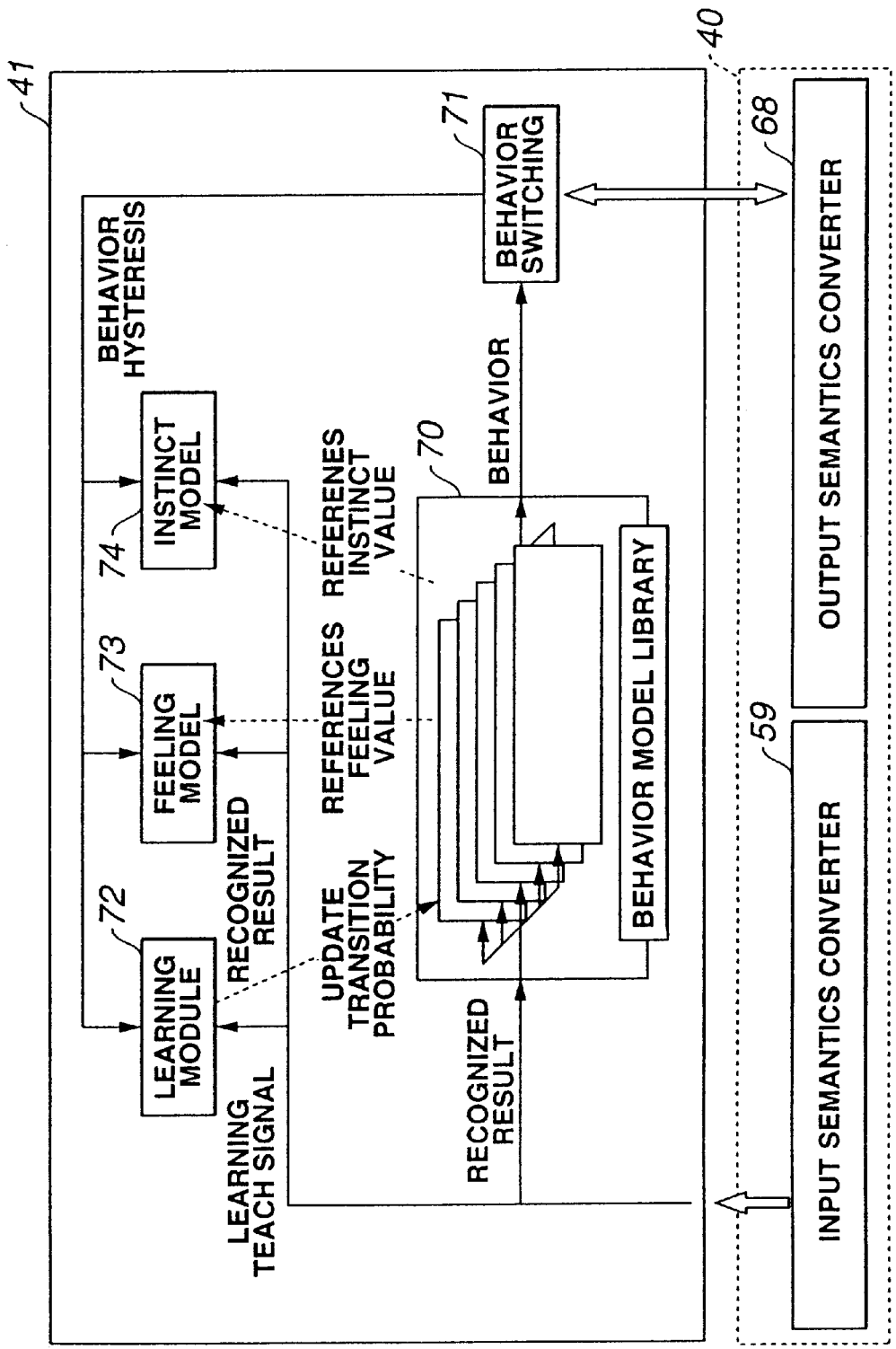
FIG. 5 is a block diagram showing the structure of an application layer in the software structure of the robot apparatus.

The application layer 41 is made up of five modules, namely a behavioral model library 70, a behavior switching module 71, a learning module 72, a feeling model 73, and an instinct model 74, as shown in FIG. 5.

Figure 6:
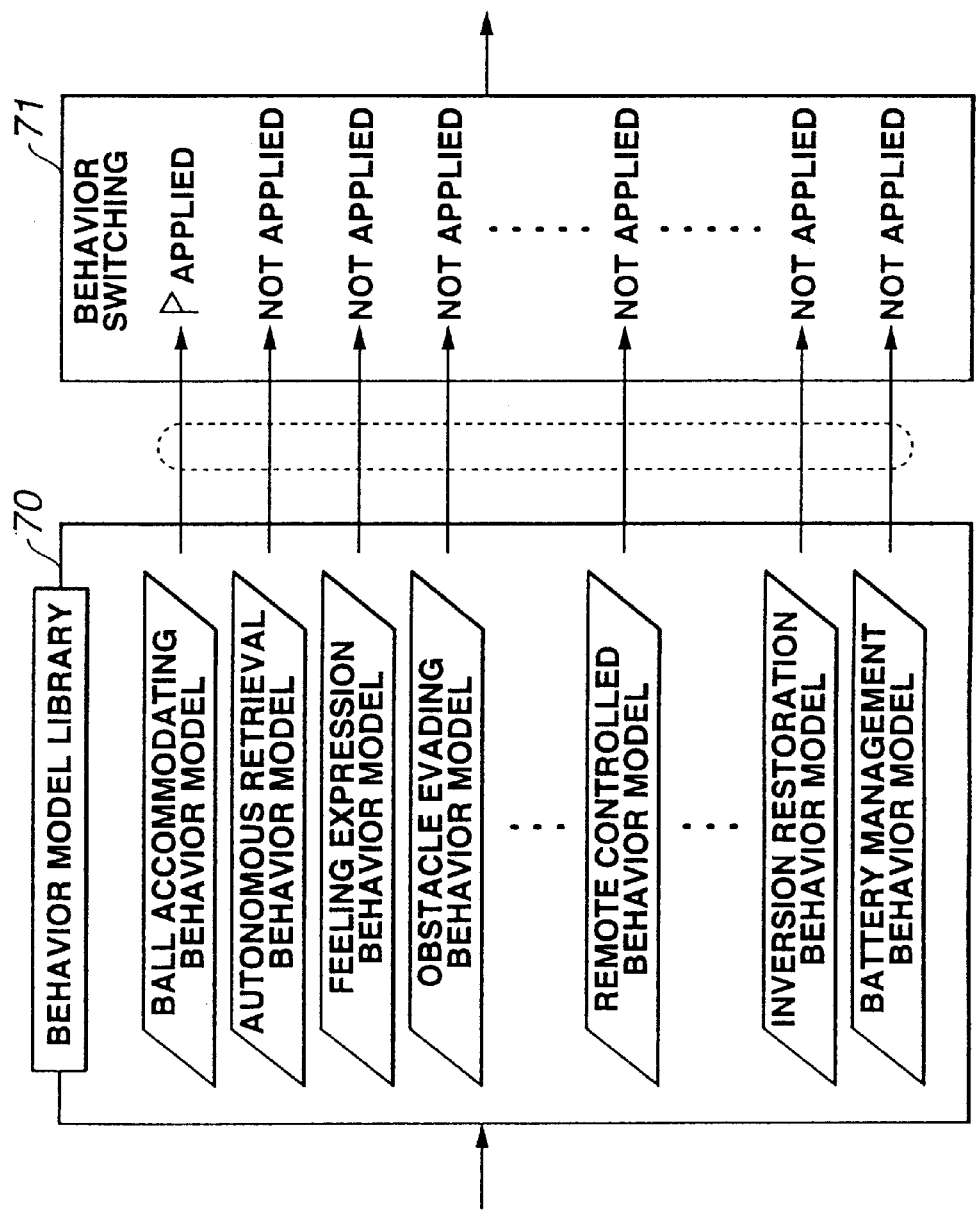
FIG. 6 is a block diagram showing the structure of a behavior model library of the application layer.
Figure 7:
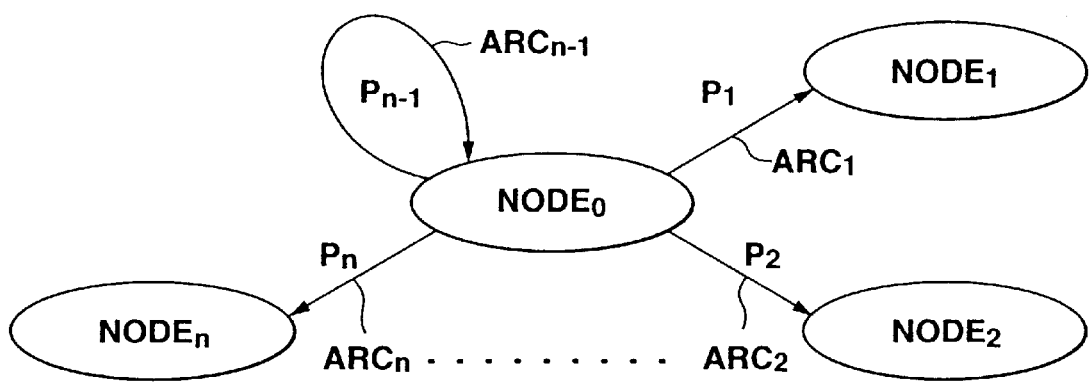
FIG. 7 illustrates an finite probability automaton as the information for determining the behavior of the robot apparatus.

The behavioral model library 70 is provided with respective independent behavioral models $70_1$ to $70_n$ in association with pre-selected several condition items, such as "residual battery capacity is small", "restoration from a leveled down state", "an obstacle is to be evaded", "a feeling expression is to be made" or "a ball has been detected", as shown in FIG. 6.

When the recognized results are given from the input semantics converter module 59, or a preset time has elapsed since the last recognized results are given, the behavioral models $70_1$ to $70_n$ determine the next ensuing behavior, as reference is had to the parameter values of the corresponding sentiment stored in the feeling model 73 or to the parameter values of the corresponding desire held in the instinct model 74, as necessary, to output the results of decision to the behavior switching module 71.

Meanwhile, in the present embodiment, the behavioral models $70_1$ to $70_n$ use an algorithm, termed a finite probability automaton, as a technique for determining the next action, With this algorithm, it is probabilistically determined to which of the nodes $NODE_0$ to $NODE_n$ and from which of the nodes $NODE_0$ to $NODE_n$ transition is to be made based on the transition probabilities $P_1$ to $P_n$ as set for respective arcs $ARC_1$ to $ARC_n$ interconnecting the respective nodes $NODE_0$ to $NODE_n$.

Specifically, each of the behavioral models $70_1$ to $70_n$ includes a status transition table 80, shown in FIG. 8, for each of the nodes $NODE_0$ to $NODE_n$, in association with the nodes $NODE_0$ to $NODE_n$, forming the respective behavioral models $70_1$ to $70_n$, respectively.

In this status transition table 80, input events (recognized results), as the transition conditions for the node in question, are listed in the order of priority, under a column entitled "names of input events", and further conditions for the transition condition in question are entered in associated rows of the columns "data names" and "data range".

Thus, if, in the node $NODE_{100}$ represented in the status transition table 80 shown in FIG. 8, the result of recognition "ball detected (BALL)" are given, the ball "size", given together with the result of recognition, being "from 0 to 1000", represents a condition for transition to another node, whereas, if the result of recognition "obstacle detected (OBSTACLE)" is given, the "distance (DISTANCE)", as given together with the result of recognition, being "from 0 to 100", represents a condition for transition to another node.

Also, if, in this node NODE100, no recognized results are input, but a parameter value of any one of "joy", "surprise" and "sadness". held in the feeling model 73, among the sentiment and desire parameters held in each of the feeling model 73 and the instinct model 74, periodically referenced by the behavioral models $70_1$, to $70_n$, are in a range from 50 to 100, transition may be made to another node.

In the status transition table 80, in the row "node of destination of transition" in the item of the "probability of transition to another node" are listed the names of the nodes to which transition can be made from the nodes $NODE_0$ to $NODE_n$. In addition, the probability of transition to other respective nodes $NODE_0$ to $NODE_n$, to which transition is possible when all of the conditions entered ill the columns "input event name", "data value" and "data range" are met, is entered in a corresponding portion in the item "probability of transition to another node", The behavior to be output in making transition to the nodes $NODE_0$ to $NODE_n$ is listed in the column "output behavior" in the item "probability of transition to another node". Meanwhile, the sum of the probability values of the respective columns in the item "probability of transition to another node" is 100 (%)

Therefore, if, in the node $NODE_{100}$, shown in the status transition table 80 of FIG. 8, the results of recognition given are such that a ball has been detected (BALL) and the ball size is in a range from 0 to 1000, transition to "node $NODE_{100}$(node 120)" can be made with a probability of 30%, with the behavior of "action 1" then being output.

The behavioral models $70_1$ to $70_n$ are arranged so that a plural number of nodes such as the node $NODE_0$ to nodes $NODE_n$ listed in the status transition table 80 are concatenated, such that, if the results of recognition are given from the input semantics converter module 59, the next action to be taken may be determined probabilistically using the status transition table 80 for the associated nodes $70_1$ to $70_n$, with the results of decision being then output to the behavior switching module 71.

The behavior switching module 71, shown in FIG. 5, selects the behavior output from the behavior model of the behavioral models $70_1$ to $70_n$ of the behavioral model library 70 having a high value of the preset priority sequence, and issues a command for executing the behavior (behavior command) to the output semantics converter module 68 of the middleware layer 40. Meanwhile, in the present embodiment, the behavioral models $70_1$ to $70_n$ shown in FIG. 6 become higher in priority sequence the lower the position of entry of the behavioral model in question.

On the other hand, the behavior switching module 71 advises the learning module 72, feeling model 73 and the instinct model 74 of the completion of the behavior, after completion of the behavior, based on the behavior end information given from the output semantics converter module 68.

The learning module 72 is fed with the results of recognition of the teaching received as the user's action, such as "hitting" or "patting" among the results of recognition given from the input semantics converter module 59.

Based on the results of recognition and the notification from the behavior switching module 71, the learning module 72 changes the values of the transition probability in the behavioral models $70_1$ to $70_n$ in the behavioral model library 70 so that the probability of occurrence of the behavior will be lowered or elevated if robot is "hit" or "scolded" for the behavior or is "patted" or "praised" for the behavior, respectively.

On the other hand, the learning module 72 holds parameters representing the intensity of each of six sentiments, namely "joy", "sadness", "anger", "surprise", "disgust" and "fear". The learning module 72 periodically updates the parameter values of these respective sentiments based on the specified results of recognition given from the input semantics converter module 59, such as "being hit" or "being patted", the time elapsed and the notification from the behavior switching module 71.

Specifically, with the amount of change ΔE[t] of the sentiment, the current value of the sentiment E[t] and with the value indicating the sensitivity of the sentiment $k_e$, calculated based e.g., on the results of recognition given by the input semantics converter module 59, the behavior of the robot apparatus 1 at such time or the time elapsed as from the previous updating, the feeling model 73 calculates a parameter value E[t+1] of the sentiment of the next period, in accordance with the following equation (1):

$$E[t+1]=E[t]+ke\times\Delta E[t] \quad (1)$$

and substitutes this for the current parameter value for the sentiment E[t] to update the parameter value for the sentiment. In similar manner, the feeling model 73 updates the parameter values of the totality of the sentiments.

It should be noted that the degree to which the results of recognition or the notification of the output semantics converter module 68 influence the amounts of variation ΔE[t] of the parameter values of the respective sentiments is predetermined, such that, for example, the results of recognition of "being hit" appreciably influence the amount of variation ΔE[t] of the parameter value of the sentiment of "anger", whilst the results of recognition of "being patted" appreciably influence the amount of variation ΔE[t] of the parameter value of the sentiment of "joy".

It should be noted that the notification from the output semantics converter module 68 is the so-called behavior feedback information (behavior completion information) or the information on the result of occurrence of the behavior. The feeling model 73 also changes the feeling based on this information. For example, the feeling level of anger may be lowered by the behavior such as "barking". Meanwhile, the notification from the output semantics converter module 68 is also input to the learning module 72, such that the learning module 72 changes the corresponding transition probability of the behavioral models $70_1$ to $70_n$.

Meanwhile, the feedback of the results of the behavior may be the to be achieved based on an output of the behavior switching module 71 behavior seasoned with feeling).

On the other hand, the instinct model 74 holds parameters indicating the strength of each of the four independent items of desire, namely "desire for exercise", "desire for affection", "appetite" and "curiosity", and periodically updates the parameter values of the respective desires based on the results of recognition given from the input semantics converter module 59, elapsed time or on the notification from the behavior switching module 71.

Specifically, with the amounts of variation ΔI[k], current parameter values I[k] and coefficients ki indicating the sensitivity of the "desire for exercise", "desire for affection" and "curiosity", as calculated in accordance with preset calculating equations based on the results of recognition, time elapsed or the notification from the output semantics converter module 68, the instinct model 74 calculates the parameter values I[k+1] of the desires of the next period, every preset period, in accordance with the following equation (2):

$$I[k+1]=I[k]+ki\times\Delta I[k] \quad (2)$$

and substitutes this for the current parameter value I[k] of the desires in question. The instinct model 74 similarly updates the parameter values of the respective desires excluding the "appetite".

It should be noted that the degree to which the results of recognition or the notification from the output semantics converter module 68, for example, influence the amount of variation ΔI[k] of the parameter values of the respective desires is predetermined, such that a notification from the output semantics converter module 68 influences the amount of variation ΔI[k] of the parameter value of "fatigue" appreciably.

It should be noted that, in the present embodiment, the parameter values of the respective sentiments and the respective desires (instincts) are controlled to be changed in a range from 0 to 100, whilst the values of the coefficients $k_o$ and $k_i$ are separately set for the respective sentiments and desires.

On the other hand, the output semantics converter module 68 of the middleware layer 40 gives abstract behavioral commands, supplied from the behavior switching module 71 of the application layer 41, such as "move forward", "rejoice", "bare" or "tracking (a ball)", to the associated signal processing modules 61 to 67 of an outputting system 69.

On receipt of the behavioral commands, the signal processing modules 61 to 67 generate servo command values to be given the corresponding actuators $25_1$, $25_2$, . . . (FIG. 2), speech data of the sound to be output from the loudspeaker 24 (FIG. 2) and/or driving data to be given the LEDs operating as "eyes" of the robot, based on the behavioral commands, to send out these data sequentially to the associated actuators $25_1$, $25_2$, . . . , loudspeaker 24 or to the LEDs through the virtual robot 33 of the robotics server object 32 and the signal processing circuit 14 (FIG. 2).

In this manner, the robot apparatus 1 is able to take autonomous behavior, responsive to its own status and to the status of the environment (outside), or responsive to commands or actions from the user, based on the control program.

(3) Leg Unit of the Robot Apparatus

Meanwhile, the leg unit 3 of the robot apparatus 1 is able to perform jumping as described above. So, the leg unit 3 of the robot apparatus 1 is now explained in detail.

(3-1) Structure of the Leg

Figure 9:
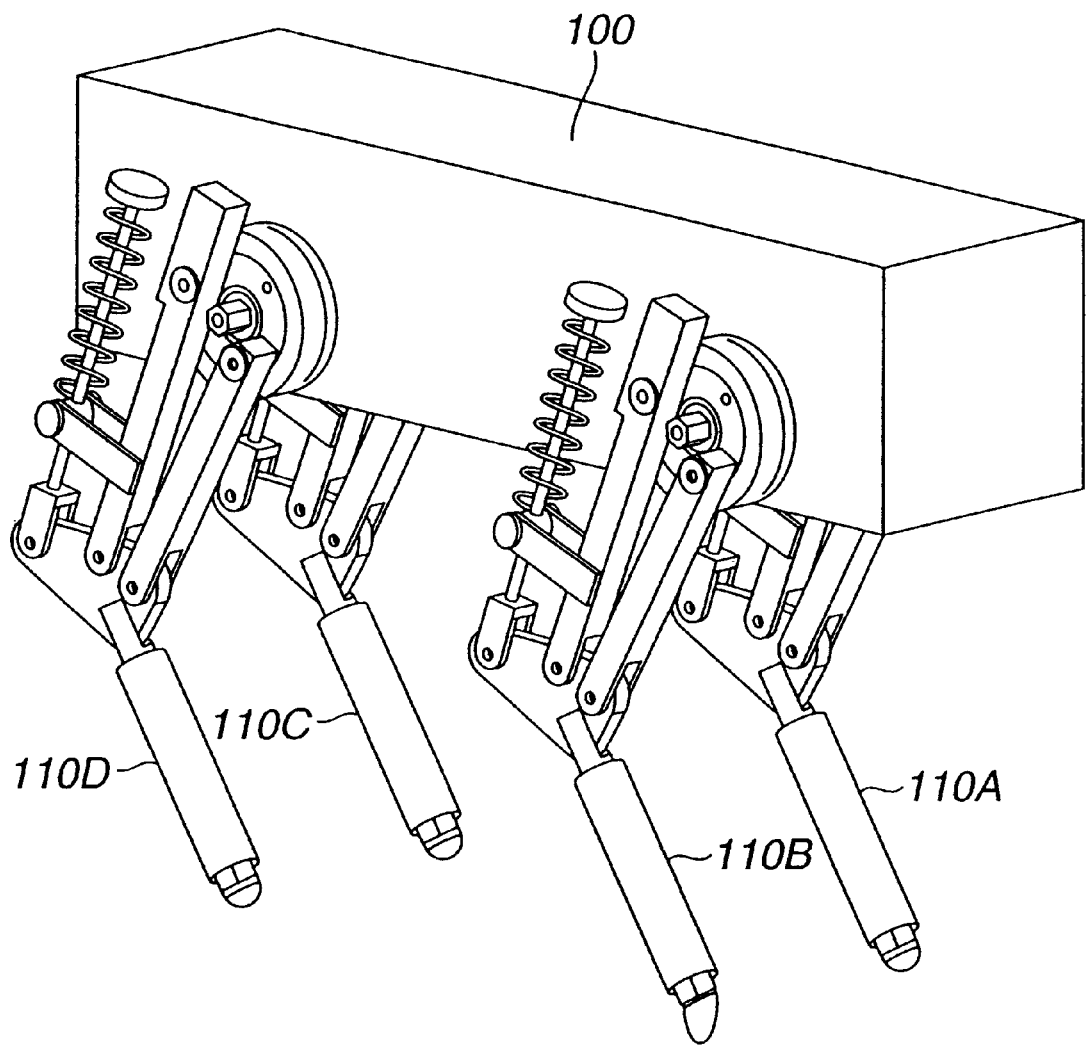
FIG. 9 is a perspective view showing the schematic of the robot apparatus with its exterior portions removed.

First, the schematic structure of the leg is explained with reference to FIGS. 9 and 10. Referring to FIG. 9, front and back leg structures 110A to 110D are connected to a trunk structure 100 of the robot apparatus 1. It is noted that the trunk structure 100 shows the portions of the trunk unit 2 excluding its exterior portion. The leg structures 110A to 110D show the portions of the leg units 3A to 3D devoid of the exterior portions. The leg structures 110A to 110D are each rotatable by a servo motor, not shown.

Figure 10:
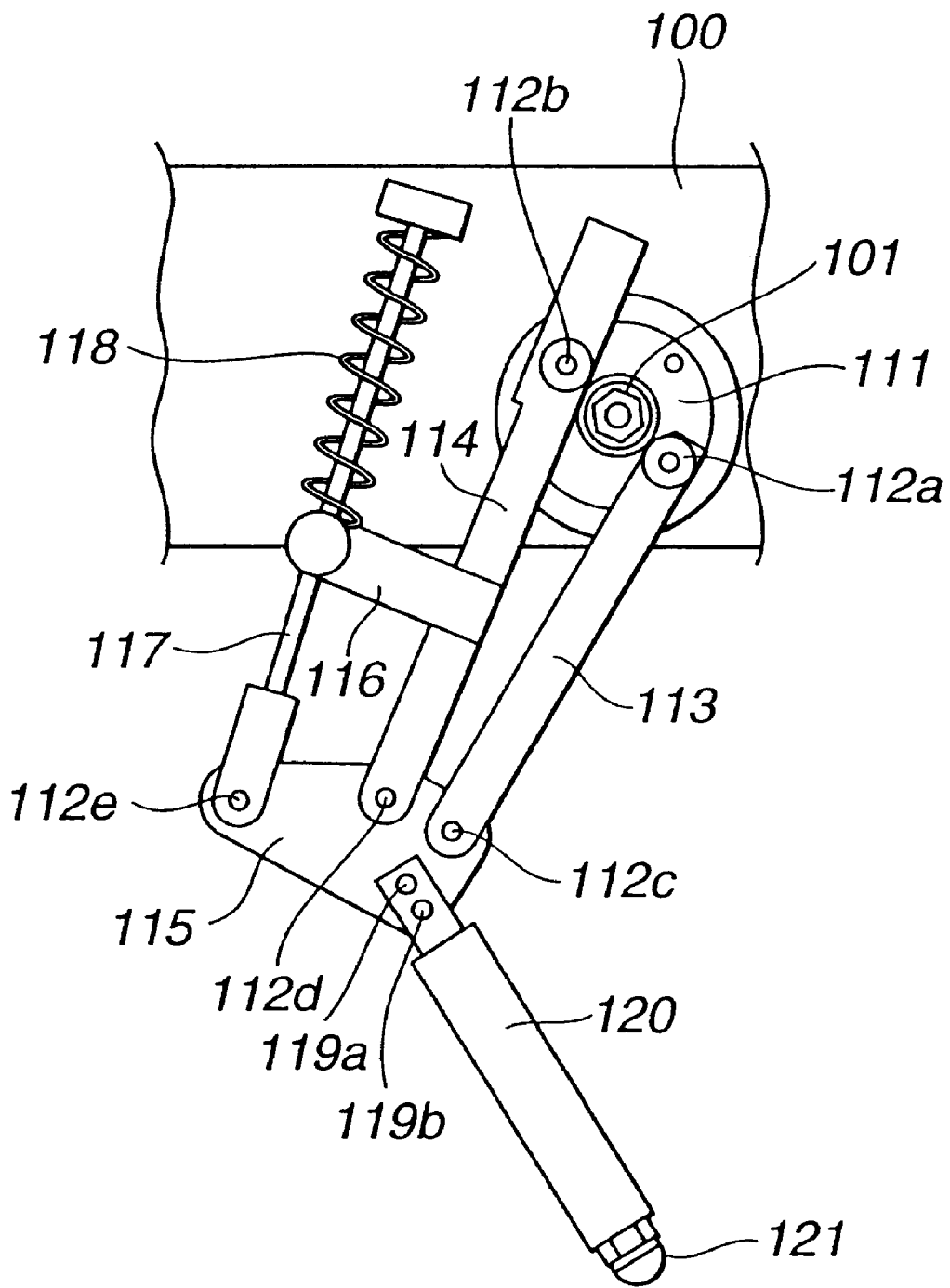
FIG. 10 is a side view showing the structure of a leg structure of the robot apparatus.

FIG. 10 shows the leg structures 110A to 110D in more detail. In FIG. 10, an optional one of the leg structures 110A to 110D is explained as being a leg structure 110.

Referring to FIG. 10, the leg structure 110 is connected through a rotary member 111 to a driving shaft 101, driven by a servo motor of the trunk structure 100. Specifically, two connecting rods 113, 114 are connected through pivots 112a, 112b in the rotary member 111 at substantially symmetrical positions with respect to the driving shaft 101. To the opposite ends of the connecting rods 113, 114 is connected a connecting member 115 through pivots 112c, 112d. Thus, a four-point link mechanism is formed by the connecting rods 113, 114 and by the pivots 112a to 112d.

An arm 116 is connected and secured at a preset position of the connecting rod 114 for extending in the opposite direction to the connecting rod 113. An insertion opening, not shown, is bored in the distal end of the arm 116. Into this opening is inserted a rod 117.

One end of the rod 117 is connected to the connecting member 115 through pivot 112c, and a coil spring 118, as an elastic member, is arranged between the opposite end of the rod 117 and the distal end of the arm 116.

A bar member 120, operating as a shin part of the robot apparatus 1, is connected and secured to a preset point of the connecting member 115 through fixed shafts 119a, 119b. A contact sensor 121 for contact detection is provided at the distal end of the bar member 120.

The connecting member 115 forms a knee joint of the robot apparatus 1. This knee joint is a passive joint passively moved by rotation of the driving shaft 110 or by stretching and contraction of the knee joint.

Meanwhile, the coil spring 118 is provided on the leg structure 100, as described above. If the knee joint is bent due to touchdown (touching the ground), the rod 117 is pulled, thereby compressing the coil spring 118. The knee joint is stretched by the recoiling force of the compressed coil spring 118 to permit the robot apparatus 1 to perform jumping. If the leg touches the ground after jumping, the knee joint is bent due to the shock brought about by touchdown, thereby similarly compressing the coil spring 118. Thus, in the leg structure 100, the potential energy on jumping is converted into an elastic energy of the coil spring 118. Thus, if only the robot apparatus 1 performs the initial jump by the operation of the servo motor. the elastic energy of the coil spring 118 may be used as a portion of the energy for the next jump, thus relieving the load of the servo motor in effecting the jumping.

Figure 11:
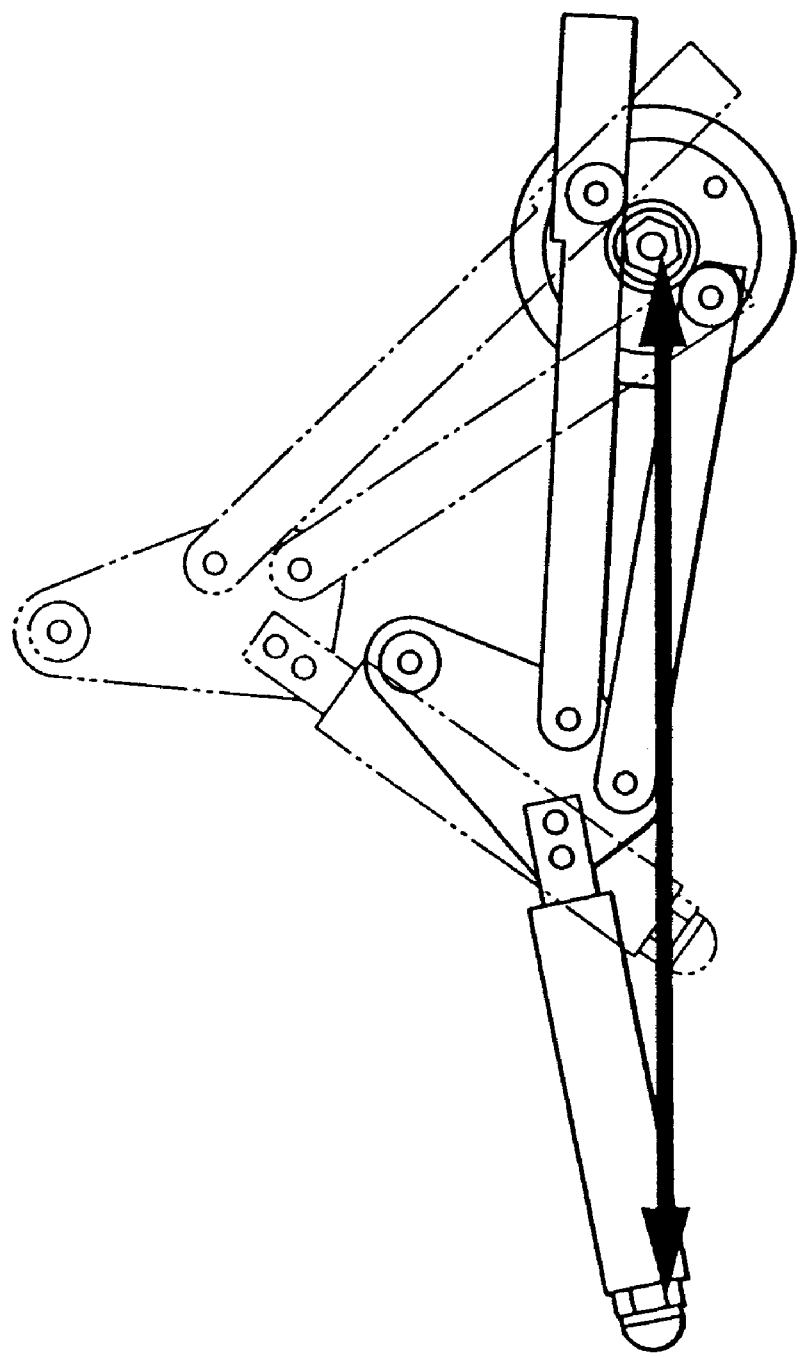
FIG. 11 is a side view showing the movement of components of the leg structure in case a knee joint can be bent on touchdown.
Figure 12:
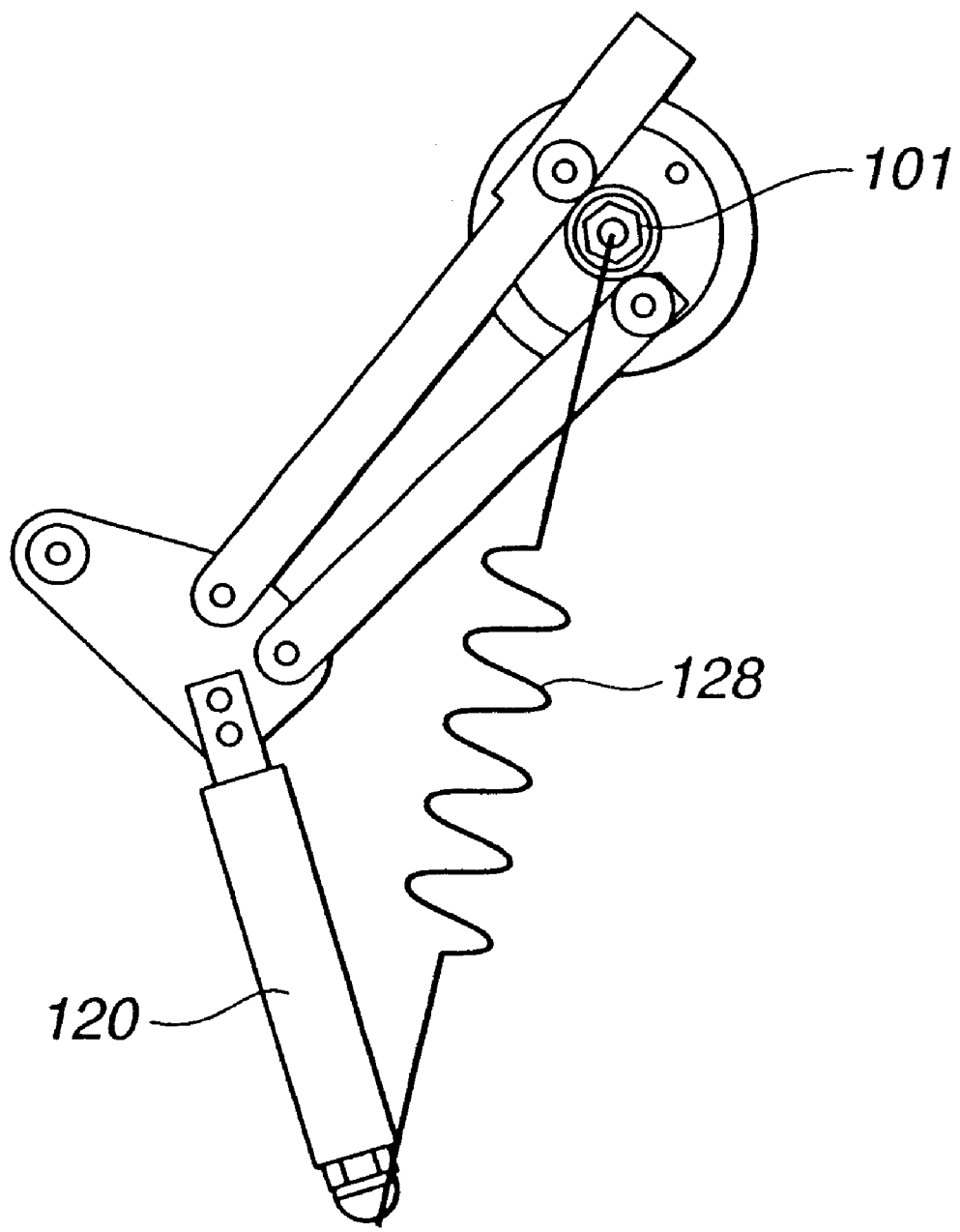
FIG. 12 is a side view showing a case having a virtual coil spring as a component of the leg structure.

Referring to FIG. 11, the movement of the leg structure 100 in case the knee joint is bent by touchdown is hereinafter explained. Since FIG. 11 is used for illustrating the movement of the distal end of the bar member 130, the rod 117, for example, is not explained here for simplicity.

The leg structure 110 is provided with the four-point link mechanism, as described above. This link mechanism operates so that, when the knee joint is stretched/bent, the distal end of the bar member 120 describes a straight line.

The coil spring 118 is placed at such a position that the a substantially linear relationship will hold between the distance between the driving shaft 101 and the distal end of the bar member 120 and the force virtually operating by the coil spring 118 between the driving shaft 101 and the distal end of the bar member 120. That is, a virtual coil spring 128 may be deemed to exist between the driving shaft 101 and the distal end of the bar member 120.

It is noted that the force acting between the driving shaft 101 and the distal end of the bar member 120 may be found as follows: If the natural length of the coil spring 118 is $L_0$ and the length of the coil spring 118 when the knee joint is bent is L, the force F acting on the coil spring 118 is expressed by $K(L_0-L)$, where K is the spring constant of the coil spring 118. If the connecting bars 113,114 are deemed to be a sole connecting bar and the distance between this connecting bar and the rod 117 is d, the force with which the knee joint seeks to be extended may be expressed by a rotational moment tau (=F·d) about the connecting member 115 as center The force $F_{virtual}$ acting between the driving shaft 101 and the distal end of the bar member 120 may be found by dividing this rotational moment tau by the distance D between a straight line interconnecting the driving shaft 101 and the distal end of the bar member 120 and the connecting member 115. On the other hand, if the connecting bars 113, 114 are deemed to be a sole connecting bar, a distance $X_{virtual}$ between the driving shaft 101 and the distal end of the bar member 120 may be found as being a function of an angle 1p3 between a line of extension of the sole connecting bar and the bar member 120.

Since the coil spring 118 of the present embodiment Is arranged such that the substantially linear relationship will hold between the force virtually operating by the coil spring 118 between the driving shaft 101 and the distal end of the bar member 120 and the distance between the distance between the driving shaft 101 and the distal end of the bar member 120, the coil spring 118 can be controlled more readily than if such relationship is nonlinear. Moreover, since the relationship may be approximated to the translational joint already analyzed, the results of search for this translational joint may be utilized effectively.

There may be a wide variety of possible types of this leg structure 110 exhibiting such linear relationship. FIGS. 13A, 13B show two exemplary types of such structure.

FIG. 13A shows a structure similar to that of the above-described leg structure 110. In the present structure, the pivot 112e is provided below a horizontal plane passing through the rotational member 112d when the coil spring 118 is of a natural length.

Figure 14:
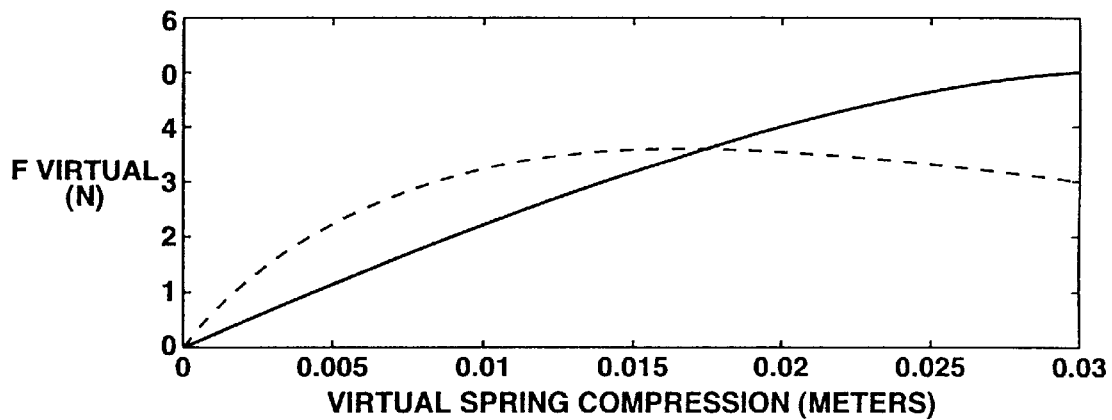
FIG. 14 is a graph showing the relation between contraction of the virtual coil spring and the force applied thereto.

In a structure shown in FIG. 13B, a connecting member different in configuration from the connecting member 116 is used. In the present structure, the pivot 112e is provided above a horizontal plane through the pivot 112d when the coil spring 118 is of a natural length. Moreover, a straight line interconnecting the rotational members 112d, 112e is substantially at right angles to the direction of stretching/contraction of the coil spring 118 when the coil spring 118 is of a natural length, FIG. 14 shows the relationship between the contraction of the distance between the driving shaft 101 and the distal end of the bar member 120, that is contraction of the virtual coil spring, and the force virtually operating between the driving shaft 101 and the distal end of the bar member 120 in each of the above-described two structures. In FIG. 14, a broken line and a solid line indicate the results for the structure shown in FIG. 13A and those for the structure shown in FIG. 13B, respectively. It may be seen from FIG. 14 that, in the structure of FIG. 13A, the virtual force acting between the driving shaft 101 and the distal end of the bar member 120 is decreased when the contraction of the virtual coil spring is larger than 0.015 m, whereas the structure shown in FIG. 13B gives a substantially linear result.

Figure 15:
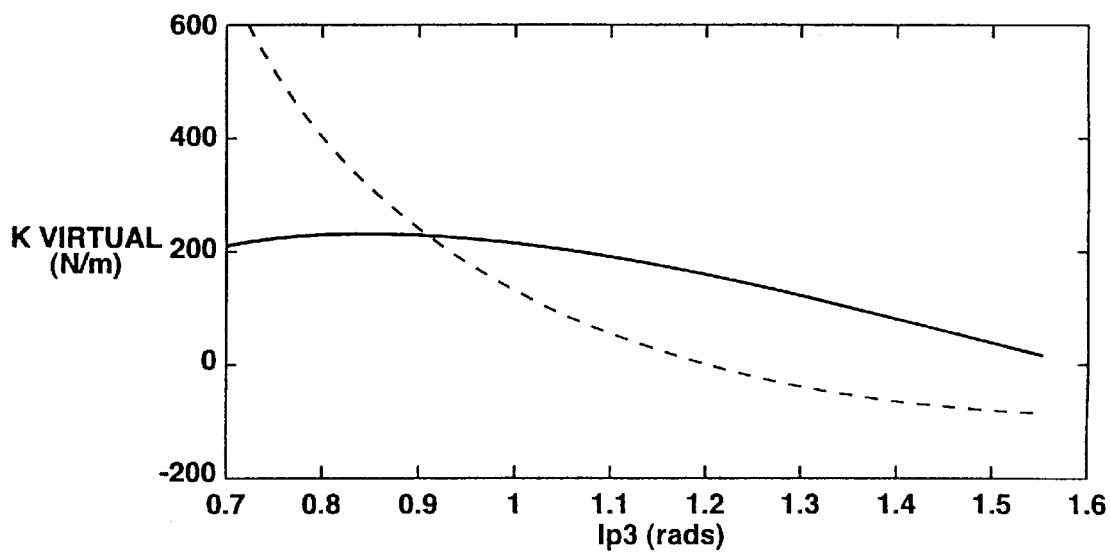
FIG. 15 is a graph showing the relation between the angle of the knee joint and the virtual coil spring.

FIG. 15 shows the relation between the spring constant of the virtual coil spring and the aforementioned angle 1p3. In this figure, as in FIG. 14, a broken line and a solid line indicate the results for the structure shown in FIG. 13A and those for the structure shown in FIG. 13b, respectively. It may be seen from FIG. 15 that, in the structure shown in FIG. 13B, the spring constant of the virtual coil spring is substantially constant, meaning that a substantially constant compliance is realized.

(3-2) Control Algorithm of Leg

In order to permit the running of the robot apparatus 1, having the above-described leg structure, a simple open-loop controller has been developed. The front and back legs are paired and synchronized to each other such that it may be deemed that two virtual legs are provided towards the front and back sides of the robot apparatus 1.

Figure 16:
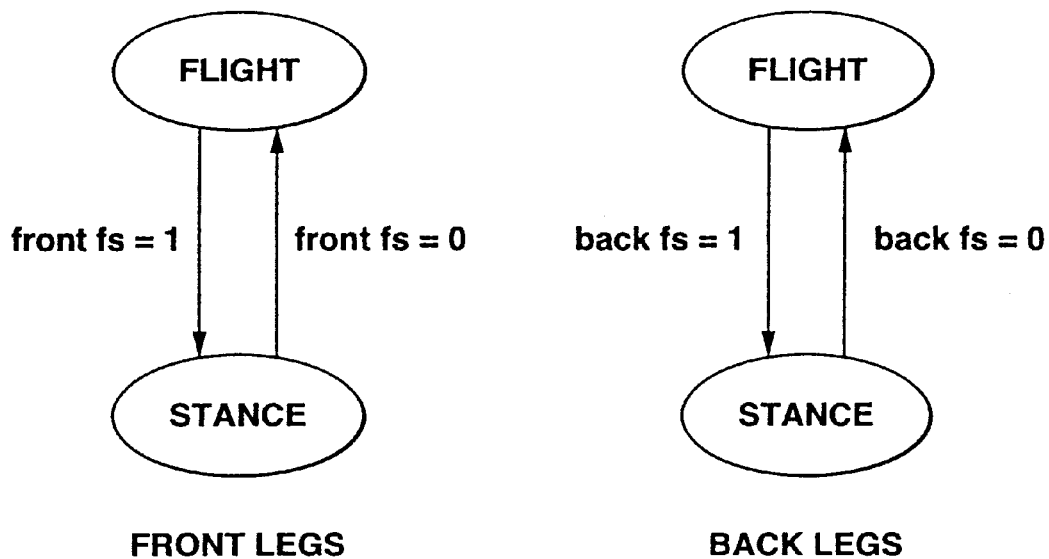
FIG. 16 shows control for legs by a controller in an embodiment of the present invention.

This controller controls the status of the legs separately for the stance state (state of the robot standing on the leg) and flight state (state of the robot whose leg is in air, that is not supported on the ground). A contact sensor 121 (FIG. 10) is provided at the leg end for detecting the touching. If this contact sensor 121 is detecting the touching, that is if the leg contacts the ground, the leg state is the stance state, whereas, if the contact sensor 121 does not detect such touching, that is if the leg is not supported on the ground, the leg state is the flight state. If, as shown in FIG. 16, the contact sensor 121 provided at the end of the front leg is not detecting the contact (front fs=0), the front leg is shifting from the stance state to the flight state, whereas, if the contact sensor 121 is detecting the contact (front fs=1), the front leg is shifting from the flight state to the stance state. In similar manner, if the contact sensor 121 provided at the end of the back leg is not detecting the contact (back fs=0), the back leg is shifting from the stance state to the flight state, whereas, if the contact sensor 121 is detecting the contact (back fs=1), the back leg is shifting from the flight state to the stance state.

In this manner, the front and back legs are controlled independently of each other by the controller. This enables more prompt control than if the front and back legs are controlled in concert by a feedback type operation.

If, in the robot apparatus 1, the leg is in the flight state, the leg is adjusted to the touchdown angle as set for touchdown, and the leg is caused to touch the ground as the touchdown angle is kept. In the stance state, following the touching with the ground, the robot apparatus 1 performs the operation of rotating the leg and kicking the ground at a preset kick speed until the limit angle as set is reached. The robot apparatus 1 is able to jump again by this force of rotation and the resistive force of the coil spring 118 (FIG. 10). Table 1 shows typical parameters of the touchdown angle, limit angle the kick speed.

TABLE 1

| state | action | parameters | values |
|---|---|---|---|
| front leg flight | step ramp | touchdown angle kick speed | −0.55 rad 10.5 rad/s |
| stance | | limit angle | −0.2 rad |
| back leg flight | step ramp | touchdown angle kicks speed | −0.3 rad 10.5 rad/s |
| stance | | limit angle | 0.1 rad |

In Table 1, if the front leg of the robot apparatus 1 is in the flight state, the front leg is set to the touchdown angle such that the leg angle with respect to the trunk is −0.55 rad, for the kick action, with the front leg being caused to touch the ground as this touchdown angle is kept. When the front leg is in the stance state, the robot apparatus 1 rotates the front leg at a kick speed of 10.5 rad/sec to kick the ground backwards, until the leg angle of −0.2 rad with respect to the trunk is reached.

Similarly, if the front leg of the robot apparatus 1 is in the flight state, the front leg is set to a touchdown angle such that the leg angle with respect to the trunk is −0.3 rad, for the kick action, with the back leg being caused to touch the ground as this touchdown angle is kept. When the back leg is in the stance state, the robot apparatus 1 rotates the back leg at a kick speed of 10.5 rad/sec to kick the ground backwards, until the leg angle of 0.1 rad with respect to the trunk is reached.

In the present embodiment, the gait of the robot apparatus 1 can be changed by setting a variety of parameters. That is, the robot apparatus 1 is able to perform the gait of pronking of jumping with all four legs substantially simultaneously and the gait of bounding of touching the ground alternately with the front and back legs. Meanwhile, since the bounding appeals to the visual sense more significantly than the pronking, and permits the robot apparatus to proceed forwards more speedily, the present embodiment sets the parameters to enable mere facilitated bounding.

Among the above-mentioned various parameters, there are inertial moment $I_{body}$(kgm$^2$) of the robot apparatus 1, weight $m_{body}$ (kg) of the robot apparatus 1, waist joint interval r(m) which is one-half the distance between the front and back legs, and the above-mentioned spring constant (N/m). In addition, the dimensionless inertial moment J, defined by the following equation (3):

$$J = I/mr^2 \qquad (3)$$

is used as a parameter. The measurement means for the trunk structure, termed the dimensionless inertial moment J, is introduced in treatises by Brown and Raibert ([K. Murphy and M. H. Raibert, "Analysis of Planer Model for Two limiting Cases, Dynamically Stable Legged Locomotion" Carnegie Mellon University, Progress Report CMU-LL-4-1985. Pp.57 to 89.], [H. B. Brown and M. H. Raibert, "Analysis of Planer Model for Two Limiting cases, Dynamically Stable legged Locomotion" Carnegie Mellon University, Progress Report CMU-LL-4-1985, pp.89 to 108).

Table 2 shows the results of simulation of the running of the robot apparatus 1 in case these parameters are changed. The values of the controller parameters shown in Table 1 are used in Table 2. The simulation system used in the present embodiment is formed by a kinematic equation including an actuator model, a senor model, and a touchdown/force application algorithm. The actuator model includes a control signal/torque function, as a velocity function, a motor sensor and a viscosity frictional model.

TABLE 2

| $I_{body}$[kg/m$^2$] | $m_{body}$[kg] | I[m] | K[N/m] | J/m$^2$ | Motion |
|---|---|---|---|---|---|
| 0.075 | 1.29 | 0.075 | 2380 | 10.32 | pronking |
| 0.075 | 1.29 | 0.085 | 2380 | 8.04 | pronking |
| 0.065 | 1.29 | 0.064 | 2380 | 12.30 | pronking |
| 0.008 | 1.29 | 0.064 | 1870 | 1.50 | pronking |
| 0.008 | 1.29 | 0.105 | 2980 | 0.56 | bounding |
| 0.004 | 1.29 | 0.085 | 2980 | 0.43 | bounding |
| 0.008 | 1.60 | 0.095 | 2980 | 0.55 | bounding |
| 0.008 | 1.60 | 0.095 | 2890 | 0.55 | bounding |

In Table 2, the results of simulation indicate that The robot apparatus 1 tends to perform bounding and pronking with the dimensionless inertial moment J less than 1 and not less than 1, respectively. This has been demonstrated by a simulation experiment by varying the dimensionless inertial moment J as explicit function and by observing the gait of the robot apparatus 1. It is noted that bounding can be realized more powerfully and readily by setting the dimensionless inertial moment J to less than 1 and by properly setting the other parameters. On the other hand, if the dimensionless inertial moment J is not less than 1, the bounding may not be realized with this controller.

It is noted that, since the dimensionless inertial moment J of the actual robot apparatus 1 is approximately 4.1, that is not less than 1, bounding cannot be realized with this controller. However, by correcting the controller as now explained, the bounding movement can be realized. The object of correcting the controller is to positively generate vertical movement (pitching) of the trunk during jumping in order to raise the tendency towards bounding.

Figure 17:
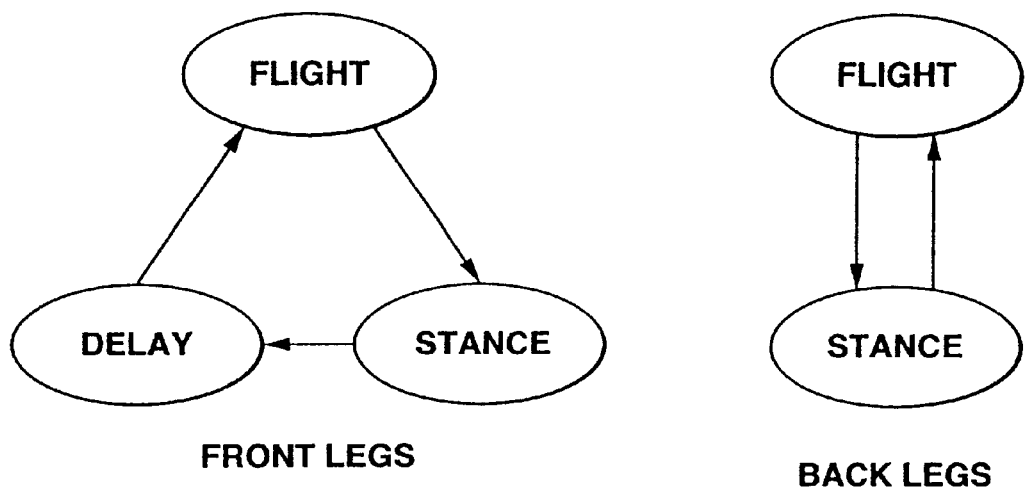
FIG. 17 shows control of legs by an as-corrected controller.

Referring to FIG. 17, with the as-corrected controller, the front leg exhibits a delayed state, in addition to the aforementioned stance and flight states. That is, the front leg transfers from the stance state of touching the ground to the delayed state to delay the kick operation of the front leg. By this delayed front leg kick, braking can be promoted to a more or less extent to intensify the pivoting movement about the front leg in the stance state. The back leg alternately shifts to the flight state and to the stance state. Table 3 shows the parameter values in the controller.

TABLE 3

| state | action | parameters | values |
|---|---|---|---|
| front leg | | | |
| flight | step | touchdown angle | −0.65 rad |
| delay | wait | delay time | 0.01 s |
| stance | ramp | kick speed | 15.5 rad |
| | | limit angle | −0.1 rad |
| back leg | | | |
| flight | step | touchdown angle | −0.2 rad |
| stance | ramp | kick speed | 8.5 rad/s |
| | | limit angle | 0.1 rad |

In Table 3, when the front leg is in the flight state, the robot apparatus 1 sets the front leg, for kick operation, to a touchdown angle such that the leg angle with respect to the trunk is −0.65 rad, with the front leg touching the ground as this touchdown angle is kept. With the front leg in the stance state, the robot apparatus 1 performs the waiting operation for 0.01s as delay time, after which it performs a kick operation of rotating the front leg with a kick speed of 15.5 rad/s, until the leg angle with respect to the trunk reaches −0.1 rad, by way of kicking the ground backwards.

With the back leg in the flight state, the robot apparatus 1 sets the back leg to a touchdown angle with respect to the trunk of −0.2 rad, by way of performing the kick operation, with the back leg touching the ground as this touchdown angle is kept. With the back leg in the stance state, the robot apparatus 1 rotates the back leg at a kick speed of 8.5 rad/s, until the leg angle with respect to the trunk reaches −0.1 rad, by way of kicking the ground backwards.

By so setting the controller parameters, the robot apparatus 1 in simulation is able to perform stabilized bounding.

Based on the above results of simulation, a jump test is conducted on an actual robot apparatus 1. Meanwhile, two computers are used in the control system for the present robot apparatus 1. One is a system module including a CPU, a battery and a communication bus, while the other is a slave controller on a tail unit module used for executing a PD servo loop at 1 kHz and for controlling a 4-channel motor amplifier. A touch sensor 21 on the head unit 4 of the robot apparatus 1 is used for startup and stop of the slave controller. The motor is fed with power (42V/1.5A) with the aid of a power supply line from outside the robot apparatus 1. The controller parameters are shown in the following Table 4:

TABLE 4

| state | actions | parameters | values |
|---|---|---|---|
| | | front leg | |
| flight | step | touchdown angle | −0.55 rad |
| delay | wait | stance delay | 0.015 sec |
| stance | ramp | sweep rate | 100 rad/s |
| | | sweep limit | −0.20 rad |
| | | back leg | |
| flight | step | touchdown angle | −0.25 rad |
| stance | ramp | sweep rate | 100 rad/s |
| | | sweep limit | 0.10 rad |

As shown in Table 4, the touchdown angle, delay time, kick speed and the limit angle of the front leg are set to −0.55 rad, 0.015 sec, 100 rad/s and to −0.2 rad, respectively, whilst those of the back leg are set to −0.25 rad, 100 rad/s and to 0.10 rad, respectively. With these parameters, stabilized bounding may be realized for the spring constant K of the coil spring of 4420 N/m may be realized.

It may be seen that, if the waist joint interval r is longer by 0.045 m, and the touchdown angle and the delay time of the front leg, among the controller parameters, are changed, stability tolerance with respect to bounding becomes extremely small. In more detail, if the touchdown angle is increased slightly by 0.05 rad or more, or the delay time is increased slightly by 5 ms or more, the running is ultimately inhibited. If conversely the parameter values are optimum, stabilized bonding can be realized on many different surfaces, such as carpet surface or on wooden or linoleum surfaces.

Figure 18:
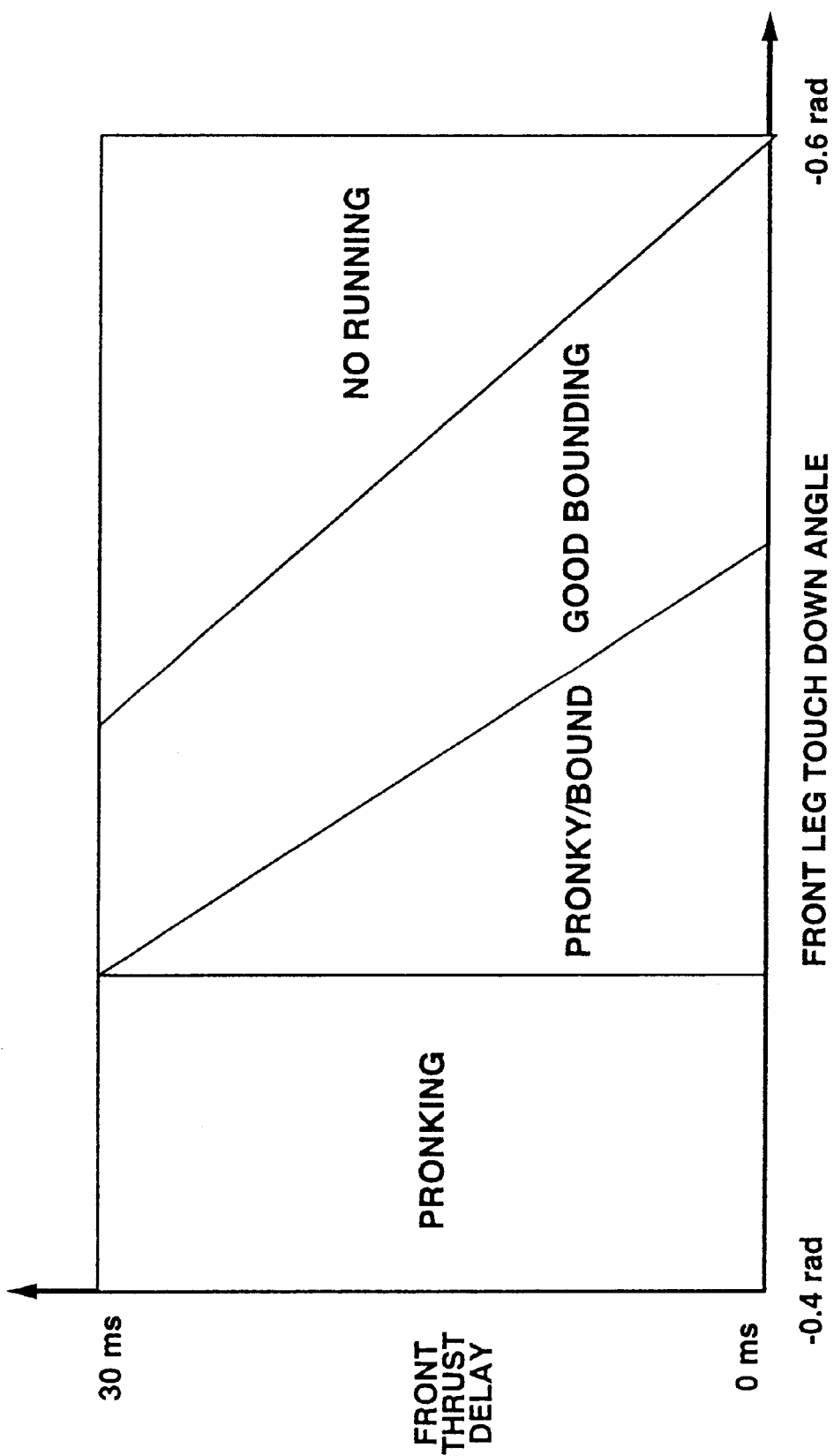
FIG. 18 is a diagram illustrating changes in the behavior in case the touchdown angle of the front legs and the delay angle are changed.

FIG. 18 shows schematic distribution of the behaviors observed with a controller for different combinations of parameters of the touchdown angle and delay time for the front leg. As shown in FIG. 18, distinction may be made between pronking, bounding approximate to pronking, bounding and not running, by changing the touchdown angle and the delay time for the front leg. Meanwhile, the illustration of FIG. 18 is merely for convenience, such that these behaviors cannot be rigorously distinguished on boundary lines.

It may be seen from FIG. 18 that, by properly setting the touchdown angle and the delay time for the front leg, the robot apparatus 1 is able to switch between the pronking mode of performing the pronking and the bounding mode of performing the bounding. For example, if the controller parameters are as shown in Table 4, the touchdown angle and the delay time are −0.55 rad and 0.015 sec, respectively, the behavior is the bounding, as may be seen from FIG. 18.

(3-3) Power Consumption

For verifying the bounding efficiency, the mechanical output during running is measured. For calculating the mechanical output at the joint, a motor current sensor on a motor amplifier lying outside the robot apparatus 1 is used. This motor amplifier generates a voltage proportionate to the motor current ($V_{i\,sense}K_{amplifier}$). If the current is established, the motor torque is calculated, using a torque constant Ki of the motor. The motor torque is multiplied with a gear speed reducing rate ($N_{gear}$) and, for calculating the loss due to the motor and the gear head, the resulting product is further multiplied with an efficiency number ($E_{moter}E_{gear}$). That is, the joint torque is calculated in accordance with the following equation (4):

$$\tau_{joint} = V_{i\,sense} K_{amplifier} \cdot Kt \cdot N_{gear} \cdot E_{moter} E_{gear} \quad (4)$$

After calculating the totality of the joint torques, the totality of instantaneous mechanical outputs are calculated using the following equation (5):

$$P_{mech.inst} = \sum_{i=1}^{4} |\omega_i \tau_i| \quad (5)$$

where ωi in the equation (5) is an angular velocity for the leg i.

Figure 19B:
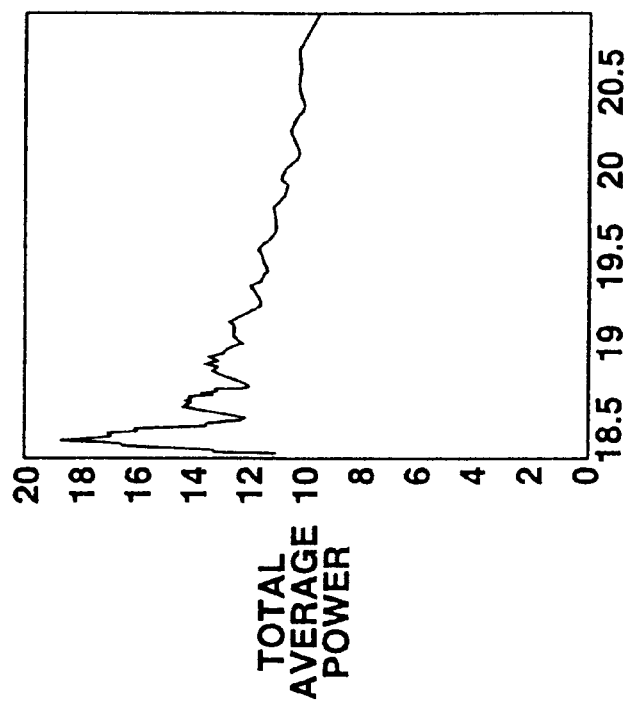
FIGS. 19A and 19B are graphs showing mechanical output during running, with FIG. 19A showing an instantaneous output for four seconds in general test running and FIG. 19B showing an average output power.
Figure 19A:
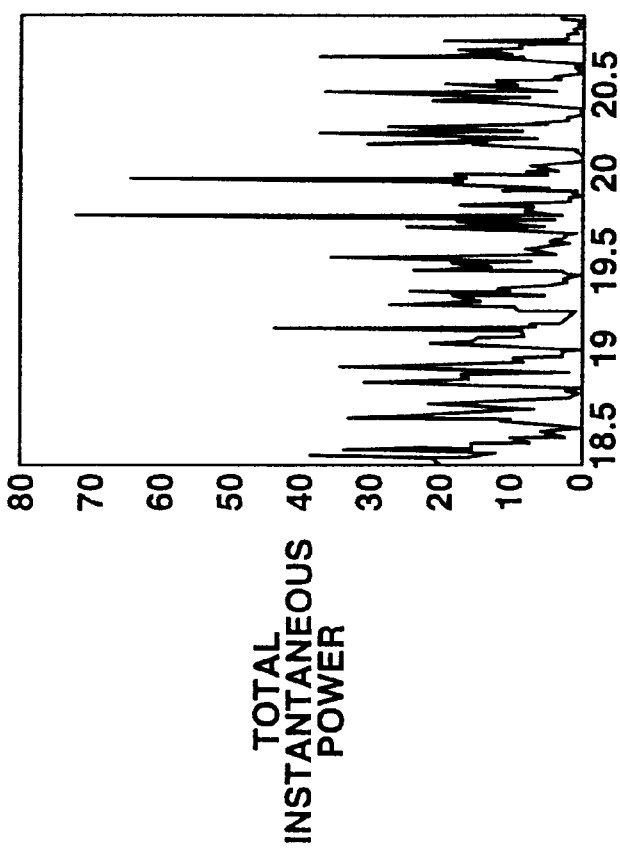

FIG. 19A shows an instantaneous output for four seconds in the general test running employing an externally mounted motor amplifier. As may be seen from FIG. 19A, the peak power reaches a value as high as 65W.

An average output power was then calculated using the following equation (6):

$$P_{mech.average} = \frac{\sum_{i=1}^{n} P_{mech.inst}}{n} \quad (6)$$

where n denotes the number of samples.

FIG. 19B shows an average output voltage. As may be seen from FIG. 19B, the average output voltage is approximately 10W.

(4) Epitome

As described above, the leg part of the robot apparatus 1 of the present embodiment is provided with a four-point link mechanism operating so that, when the legjoint performs stretching/bending movement, the trajectory of the distal end of the leg part is linear. In addition, since the coil spring 118 is mounted at a position such that the relation between the distance driving shaft 101 and the distal end of the bar member 120 and the force virtually operating between the distance driving shaft 101 and the distal end of the bar member 120 is substantially linear, the leg structure may be deemed to be approximate to the translational joint.

Moreover, in the robot apparatus 1, since the coil spring 118 is extended/contracted by the stretching/bending of the knee joint, the elastic energy stored in the coil spring 118 may be used as a portion of the energy for the next jump to relieve the servo motor load in jumping.

By properly setting controller parameters, the robot apparatus 1 is able to switch between the pronking mode of performing the pronking and the bounding mode of performing the bounding.

The present invention is not to be limited to the embodiments, as herein explained, but may be suitably modified without departing from its scope.

For example, the robot apparatus 1 is not limited to the above-described embodiment such that the legs may be one pair of legs or three or more pairs of legs.

According to the present invention, a robot apparatus is a component performing mechanical movements. Thus, the present invention may be applied to a toy having legs. That is, the robot apparatus encompasses toys as well.

What is claimed is:

1. A robot apparatus in which a leg part including a link mechanism connected to an elastic member is rotationally mounted to a trunk part through driving means, wherein
said elastic member is mounted so that a substantially linear relation holds between the distance between said driving means and the distal end of the leg part and a force virtually operating between said driving means and the distal end of the leg part.

2. The robot apparatus according to claim 1 wherein said link mechanism includes a first connecting bar having its one end rotationally connected to a rotational member rotated by said driving means and another end rotationally connected to a connecting member and a second connecting bar having one end rotationally connected to said rotational member and another end rotationally connected to said connecting member, to form a four-point link mechanism;
said four-point link mechanism being formed to provide for a linear trajectory of the distal end of said leg part.

3. The robot apparatus according to claim 2 wherein said elastic member is connected to said second connecting bar to apply an elastic force to a preset point of said connecting member.

4. The robot apparatus according to claim 2 wherein said second connecting bar has an arm and wherein
said elastic member is connected to the distal end of said arm and to one end of said second connecting bar.

5. The robot apparatus according to claim 4 wherein
a line segment interconnecting a pivot interconnecting said connecting member and said second connecting bar and the point of application of the elastic force by said elastic member is substantially perpendicular to the direction of elongation/contraction of said elastic member.

6. The robot apparatus according to claim 1 having the appearance of a quadruped, wherein
said leg part is front and back legs.

7. A robot apparatus having at least one pair of leg parts provided protruding from a main body portion;
at least one pair of the leg parts transfer from a stance state with the distal ends of the leg parts touching the ground to a flight state with said distal ends floating in air after lapse of a preset time, by way of performing jumping.

8. The robot apparatus according to claim 7 comprising:
a pair of front leg parts and a air of back leg parts; wherein
at least one of said front and back leg parts transfer from a stance state with the distal ends of the leg parts touching the ground to a flight state with said distal ends floating in air after lapse of a preset time.

9. The robot apparatus according to claim 8 comprising:
a contact sensor for contact detection, said contact sensor being provided at the distal ends of said front and back leg parts.

10. The robot apparatus according to claim 8 wherein
the jumping can be switched by changing the touchdown angle and the delay time of said at least one leg part.

11. The robot apparatus according to claim 10 wherein
said jumping mode at least includes a pronking of jumping with both said front and back legs touching the ground and jumping substantially simultaneously and a bounding mode of jumping with said front and back leg parts alternately touching the ground.

12. The robot apparatus according to claim 7 wherein
said leg part includes a link mechanism connected to an elastic member and is rotationally connected to a trunk part through driving means, wherein
said elastic member is mounted so that a substantially linear relation holds between the distance between said driving means and the distal end of the leg part and a force virtually operating between said driving means and the distal end of the leg part.

13. The robot apparatus according to claim 12 wherein
said link mechanism includes a first connecting bar having one end rotationally connected to a rotational member rotated by said driving means, said first connecting bar having another end rotationally connected to a connecting member, said link mechanism also including a second connecting bar having one end rotationally connected to said rotational member and another end rotationally connected to said connecting member, to form a four-point link mechanism;
said four-point link mechanism being formed to provide for a linear trajectory of the distal end of said leg part.

14. Apparatus for controlling the jumping of a robot apparatus in which a leg part is coupled to a trunk part, comprising a link mechanism connected to an elastic member and rotationally mounted to said trunk part through driving means, said elastic member being mounted so that a substantially linear relation holds between the distance between said driving means and the distal end of the leg part and a force virtually operating between said driving means and the distal end of the leg part.

15. The apparatus of claim 14 wherein said link mechanism includes a first connecting bar having its one end rotationally connected to a rotational member rotated by said driving means and another end rotationally connected to a connecting member and a second connecting bar having one end rotationally connected to said rotational member and another end rotationally connected to said connecting member, to form a four-point link mechanism;

said four-point link mechanism being formed to provide for a linear trajectory of the distal end of said leg part.

16. A method for controlling the jumping of a robot apparatus having at least one pair of leg parts protruding from a main body portion, comprising:

a delaying step for providing a delay of a preset time from a stance state with said at least one pair of leg parts touching the ground; and a step of transferring to a flight state with said at least one pair of legs floating in air after lapse of said delay;

transferring being made sequentially from said stance state through said delaying step to said flight state to perform jumping.

17. The method of claim 16 wherein the robot apparatus includes a pair of front leg parts and a pair of back leg parts.

18. The method of claim 17 further comprising the step of changing a touchdown angle and the delay time of said at least one leg part to switch the jumping of said robot apparatus.

19. The method of claim 18 wherein said jumping mode at least includes a pronking mode of jumping with both said front and back legs touching the ground and jumping substantially simultaneously and a bounding mode of jumping with said front and back leg parts alternately touching the ground.

* * * * *